US010937031B2

(12) United States Patent
Monk et al.

(10) Patent No.: US 10,937,031 B2
(45) Date of Patent: Mar. 2, 2021

(54) SYSTEM AND METHOD FOR LOCAL DATA CONVERSION

(71) Applicant: VISA INTERNATIONAL SERVICE ASSOCIATION, San Francisco, CA (US)

(72) Inventors: Justin Monk, Parker, CO (US); Kaushik Subramanian, Fremont, CA (US); Thanigaivel Ashwin Raj, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 746 days.

(21) Appl. No.: 15/664,597

(22) Filed: Jul. 31, 2017

(65) Prior Publication Data

US 2017/0330185 A1    Nov. 16, 2017

Related U.S. Application Data

(63) Continuation of application No. 13/888,181, filed on May 6, 2013, now abandoned.
(Continued)

(51) Int. Cl.
*G06Q 20/40* (2012.01)
*G06Q 20/32* (2012.01)
*G06Q 20/38* (2012.01)

(52) U.S. Cl.
CPC ....... *G06Q 20/405* (2013.01); *G06Q 20/3224* (2013.01); *G06Q 20/385* (2013.01); *G06Q 20/40* (2013.01)

(58) Field of Classification Search
None
See application file for complete search history.

(56) References Cited

U.S. PATENT DOCUMENTS 5,613,012 A    3/1997  Hoffman
5,781,438 A    7/1998  Lee
(Continued)

FOREIGN PATENT DOCUMENTS

EP    2156397 A1    2/2010
KR    1020030058010    7/2003
(Continued)

OTHER PUBLICATIONS

Voss, W. Gregory, "Cross-Border Data Flows, The GDPR, and Data Governance"; Washington International Law Journal. Jun. 2020, vol. 29 Issue 3, p. 485-531. 47p. (Year: 2020).*
(Continued)

*Primary Examiner* — David P Sharvin
(74) *Attorney, Agent, or Firm* — Kilpatrick Townsend & Stockton LLP

(57) ABSTRACT

Embodiments of the invention are directed to methods, apparatuses, computer readable media and systems for processing transactions using conversion or filtering of restricted information. One embodiment of the invention is directed to a method comprising receiving, at a server computer located outside a restricted zone, a transaction request message including an unrestricted account alias, wherein the unrestricted account alias was previously converted from a restricted account identifier into the unrestricted account alias by a server computer located in a restricted zone. The server computer located outside the restricted zone may determine an account associated with the unrestricted account alias and process the transaction request message. Similar methods may be applied to settlement files including an unrestricted account alias that is converted to a restricted account identifier. Other embodiments are directed to filtering restricted information from service requests or other transactions.

9 Claims, 6 Drawing Sheets

Related U.S. Application Data

(60) Provisional application No. 61/643,050, filed on May 4, 2012.

(56) References Cited

U.S. PATENT DOCUMENTS

| | | | |
|---|---|---|---|
| 5,883,810 | A | 3/1999 | Franklin |
| 5,953,710 | A | 9/1999 | Fleming |
| 5,956,699 | A | 9/1999 | Wong |
| 6,000,832 | A | 12/1999 | Franklin |
| 6,014,635 | A | 1/2000 | Harris |
| 6,044,360 | A | 3/2000 | Picciallo |
| 6,163,771 | A | 12/2000 | Walker |
| 6,227,447 | B1 | 5/2001 | Campisano |
| 6,236,981 | B1 | 5/2001 | Hill |
| 6,267,292 | B1 | 7/2001 | Walker |
| 6,327,578 | B1 | 12/2001 | Linehan |
| 6,341,724 | B2 | 1/2002 | Campisano |
| 6,385,596 | B1 | 5/2002 | Wiser |
| 6,422,462 | B1 | 7/2002 | Cohen |
| 6,425,523 | B1 | 7/2002 | Shem Ur |
| 6,592,044 | B1 | 7/2003 | Wong |
| 6,636,833 | B1 | 10/2003 | Flitcroft |
| 6,675,153 | B1* | 1/2004 | Cook .............. G06Q 20/02 705/64 |
| 6,748,367 | B1 | 6/2004 | Lee |
| 6,805,287 | B2 | 10/2004 | Bishop |
| 6,879,965 | B2 | 4/2005 | Fung |
| 6,891,953 | B1 | 5/2005 | DeMello |
| 6,901,387 | B2 | 5/2005 | Wells |
| 6,931,382 | B2 | 8/2005 | Laage |
| 6,938,019 | B1 | 8/2005 | Uzo |
| 6,941,285 | B2 | 9/2005 | Sarcanin |
| 6,980,670 | B1 | 12/2005 | Hoffman |
| 6,990,470 | B2 | 1/2006 | Hogan |
| 6,991,157 | B2 | 1/2006 | Bishop |
| 7,051,929 | B2 | 5/2006 | Li |
| 7,069,249 | B2 | 6/2006 | Stolfo |
| 7,103,576 | B2 | 9/2006 | Mann, III |
| 7,113,930 | B2 | 9/2006 | Eccles |
| 7,136,835 | B1 | 11/2006 | Flitcroft |
| 7,177,835 | B1 | 2/2007 | Walker |
| 7,177,848 | B2 | 2/2007 | Hogan |
| 7,194,437 | B1 | 3/2007 | Britto |
| 7,209,561 | B1 | 4/2007 | Shankar et al. |
| 7,264,154 | B2 | 9/2007 | Harris |
| 7,287,692 | B1 | 10/2007 | Patel |
| 7,292,999 | B2 | 11/2007 | Hobson |
| 7,350,230 | B2 | 3/2008 | Forrest |
| 7,353,382 | B2 | 4/2008 | Labrou |
| 7,379,919 | B2 | 5/2008 | Hogan |
| RE40,444 | E | 7/2008 | Linehan |
| 7,415,443 | B2 | 8/2008 | Hobson |
| 7,444,676 | B1 | 10/2008 | Asghari-Kamrani |
| 7,469,151 | B2 | 12/2008 | Khan |
| 7,548,889 | B2 | 6/2009 | Bhambri |
| 7,567,934 | B2 | 7/2009 | Flitcroft |
| 7,567,936 | B1 | 7/2009 | Peckover |
| 7,571,139 | B1 | 8/2009 | Giordano |
| 7,571,142 | B1 | 8/2009 | Flitcroft |
| 7,580,898 | B2 | 8/2009 | Brown |
| 7,584,153 | B2 | 9/2009 | Brown |
| 7,593,896 | B1 | 9/2009 | Flitcroft |
| 7,606,560 | B2 | 10/2009 | Labrou |
| 7,627,531 | B2 | 12/2009 | Breck |
| 7,627,895 | B2 | 12/2009 | Gifford |
| 7,650,314 | B1 | 1/2010 | Saunders |
| 7,685,037 | B2 | 3/2010 | Reiners |
| 7,702,578 | B2 | 4/2010 | Fung |
| 7,707,120 | B2 | 4/2010 | Dominguez |
| 7,712,655 | B2 | 5/2010 | Wong |
| 7,734,527 | B2 | 6/2010 | Uzo |
| 7,753,265 | B2 | 7/2010 | Harris |
| 7,770,789 | B2 | 8/2010 | Oder, II |
| 7,784,685 | B1 | 8/2010 | Hopkins, III |
| 7,793,851 | B2 | 9/2010 | Mullen |
| 7,801,826 | B2 | 9/2010 | Labrou |
| 7,805,376 | B2 | 9/2010 | Smith |
| 7,805,378 | B2 | 9/2010 | Berardi |
| 7,818,264 | B2 | 10/2010 | Hammad |
| 7,828,220 | B2 | 11/2010 | Mullen |
| 7,835,960 | B2 | 11/2010 | Breck |
| 7,841,523 | B2 | 11/2010 | Oder, II |
| 7,841,539 | B2 | 11/2010 | Hewton |
| 7,844,550 | B2 | 11/2010 | Walker |
| 7,848,980 | B2 | 12/2010 | Carlson |
| 7,849,020 | B2 | 12/2010 | Johnson |
| 7,853,529 | B1 | 12/2010 | Walker |
| 7,853,995 | B2 | 12/2010 | Chow |
| 7,865,414 | B2 | 1/2011 | Fung |
| 7,873,579 | B2 | 1/2011 | Hobson |
| 7,873,580 | B2 | 1/2011 | Hobson |
| 7,890,393 | B2 | 2/2011 | Talbert |
| 7,891,563 | B2 | 2/2011 | Oder, II |
| 7,896,238 | B2 | 3/2011 | Fein |
| 7,908,216 | B1 | 3/2011 | Davis et al. |
| 7,922,082 | B2 | 4/2011 | Muscato |
| 7,931,195 | B2 | 4/2011 | Mullen |
| 7,937,324 | B2 | 5/2011 | Patterson |
| 7,938,318 | B2 | 5/2011 | Fein |
| 7,954,705 | B2 | 6/2011 | Mullen |
| 7,959,076 | B1 | 6/2011 | Hopkins, III |
| 7,996,288 | B1 | 8/2011 | Stolfo |
| 8,025,223 | B2 | 9/2011 | Saunders |
| 8,046,256 | B2 | 10/2011 | Chien |
| 8,060,448 | B2 | 11/2011 | Jones |
| 8,060,449 | B1 | 11/2011 | Zhu |
| 8,074,877 | B2 | 12/2011 | Mullen |
| 8,074,879 | B2 | 12/2011 | Harris |
| 8,082,210 | B2 | 12/2011 | Hansen |
| 8,095,113 | B2 | 1/2012 | Kean |
| 8,104,679 | B2 | 1/2012 | Brown |
| RE43,157 | E | 2/2012 | Bishop |
| 8,109,436 | B1 | 2/2012 | Hopkins, III |
| 8,121,942 | B2 | 2/2012 | Carlson |
| 8,121,956 | B2 | 2/2012 | Carlson |
| 8,126,449 | B2 | 2/2012 | Beenau |
| 8,132,723 | B2 | 3/2012 | Hogg et al. |
| 8,171,525 | B1 | 5/2012 | Pelly |
| 8,175,973 | B2 | 5/2012 | Davis et al. |
| 8,190,523 | B2 | 5/2012 | Patterson |
| 8,196,813 | B2 | 6/2012 | Vadhri |
| 8,205,791 | B2 | 6/2012 | Randazza |
| 8,219,489 | B2 | 7/2012 | Patterson |
| 8,224,702 | B2 | 7/2012 | Mengerink |
| 8,225,385 | B2 | 7/2012 | Chow |
| 8,229,852 | B2* | 7/2012 | Carlson .............. G06Q 20/04 705/44 |
| 8,265,993 | B2 | 9/2012 | Chien |
| 8,280,777 | B2 | 10/2012 | Mengerink |
| 8,281,991 | B2 | 10/2012 | Wentker et al. |
| 8,328,095 | B2 | 12/2012 | Oder, II |
| 8,336,088 | B2 | 12/2012 | Raj et al. |
| 8,346,666 | B2 | 1/2013 | Lindelsee et al. |
| 8,376,225 | B1 | 2/2013 | Hopkins, III |
| 8,380,177 | B2 | 2/2013 | Laracey |
| 8,387,873 | B2 | 3/2013 | Saunders |
| 8,401,539 | B2 | 3/2013 | Beenau |
| 8,401,898 | B2 | 3/2013 | Chien |
| 8,402,555 | B2 | 3/2013 | Grecia |
| 8,403,211 | B2 | 3/2013 | Brooks |
| 8,412,623 | B2 | 4/2013 | Moon |
| 8,412,837 | B1 | 4/2013 | Emigh |
| 8,417,642 | B2 | 4/2013 | Oren |
| 8,447,699 | B2 | 5/2013 | Batada |
| 8,453,223 | B2 | 5/2013 | Svigals |
| 8,453,925 | B2 | 6/2013 | Fisher |
| 8,458,487 | B1 | 6/2013 | Palgon |
| 8,484,134 | B2 | 7/2013 | Hobson |
| 8,485,437 | B2 | 7/2013 | Mullen |
| 8,494,959 | B2 | 7/2013 | Hathaway |
| 8,498,908 | B2 | 7/2013 | Mengerink |
| 8,504,475 | B2 | 8/2013 | Brand et al. |
| 8,504,478 | B2 | 8/2013 | Saunders |

(56) References Cited

U.S. PATENT DOCUMENTS

| | | |
|---|---|---|
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0052244 A1 | 2/2008 | Tsuei et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0004547 A1 | 1/2011 | Giordano et al. |
| 2011/0010292 A1 | 1/2011 | Giordano |

(56) References Cited

U.S. PATENT DOCUMENTS

| | | |
|---|---|---|
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0109818 A1* | 5/2012 | Carlson ............... G06Q 20/3223 705/39 |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |

(56) References Cited

U.S. PATENT DOCUMENTS

| | | |
|---|---|---|
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0210628 A1 | 7/2016 | McGuire |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| KR | 1020070092400 | 9/2007 |
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013166501 | 11/2013 |
| WO | 2013179271 A2 | 12/2013 |

OTHER PUBLICATIONS

"Gramm-Leach-Biiley Act", Title 15, Chapter 94, Subchatper 1, Sec. 6801 US Code.

U.S. Appl. No. 13/888,181 , "Final Office Action", dated Apr. 10, 2017, 11 pages.

U.S. Appl. No. 13/888,181 , "Final Office Action", dated Jun. 16, 2015, 23 pages.

U.S. Appl. No. 13/888,181 , "Non final office action", dated Sep. 23, 2014, 18 Pages.

U.S. Appl. No. 13/888,181 , "Non-Final Office Action", dated Aug. 25, 2016, 11 pages.

U.S. Appl. No. 61/879,632 , "U.S. Provisional Application No.", Systems and Methods for Managing Mobile Cardholder Verification Methods, filed Sep. 18, 2013, 24 pages.

PCT/US2013/039746 , "International Search Report & Written Opinion", dated Aug. 13, 2013, 5 pages.

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Stubbs et al., U.S. Appl. No. 62/103,522 (unpublished), Methods and Systems for Wallet Provider Provisioning filed Jan. 14, 2015.

(56) References Cited

OTHER PUBLICATIONS

Flurscheim et al., U.S. Appl. No. 62/108,403 (unpublished), Wearables With NFC HCE filed Jan. 27, 2015.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.

\* cited by examiner

SYSTEM AND METHOD FOR LOCAL DATA CONVERSION

CROSS-REFERENCES TO RELATED APPLICATIONS

The present application is continuation of U.S. application Ser. No. 13/888,181, filed May 6, 2013, which is a non-provisional application of and claims priority to U.S. Provisional Application No. 61/643,050, filed May 4, 2012, the entire contents of which are herein incorporated by reference for all purposes.

BACKGROUND

As electronic devices become more abundant, powerful, and capable of performing more tasks, mobile communication devices have become instrumental in processing and completing a number of different types of transactions. This is especially true of developing and rural regions where traditional transaction processing infrastructure does not exist. Accordingly, the use of mobile devices in payment transactions has become more common, ubiquitous, and desirable by consumers. However, as more cities, counties, states, countries, and regions use mobile and public communications infrastructure for processing payments, different national, legal, and geographical barriers have created a patchwork of different regulations, restrictions, and rules related to the transfer of information across these legal and physical barriers.

For example, some regions may have restrictions on the type of information that can be exported outside of the region and/or may have limited data processing capabilities.

Embodiments of the invention provide technical solutions to these and other problems, individually and collectively.

BRIEF SUMMARY

Embodiments of the invention are directed to methods, apparatuses, computer readable media, and systems for processing transactions at a central processor located outside of a restricted zone using conversion or filtering of restricted data to unrestricted data. Embodiments of the present invention provide an easily customizable system that facilitates centralized processing of transactions comprising restricted information for different regions with different restrictions in order to allow a centralized processor located outside of a restricted area to process a transaction originating from within a restricted area.

One embodiment of the invention is directed to a method comprising receiving, at a server computer located outside a restricted zone, a transaction request message including an unrestricted account alias, wherein the unrestricted account alias was previously converted from a restricted account identifier into the unrestricted account alias by a server computer located in a restricted zone. The server computer located outside the restricted zone may determine an account associated with the unrestricted account alias and process the transaction request message. Furthermore, the server computer may generate a settlement file associated with the transaction request message including the unrestricted account alias and send the settlement file to the server computer located in the restricted zone. The server computer located in the restricted zone converts the unrestricted account alias to the restricted account identifier and send the settlement file to a mobile network operator associated with the transaction request message, and wherein the mobile network operator settles the transaction by transferring money between one or more accounts or issuers located in the restricted zone.

Another embodiment is directed to a central processing platform comprising a management server computer coupled to an account information database, the management service computer comprising a processor; and a computer-readable medium coupled to the processor, the computer-readable medium comprising code configured to perform a method, the method comprising receiving a transaction request message including an unrestricted account alias, wherein the unrestricted account alias was previously converted from a restricted account identifier into the unrestricted account alias by a server computer located in a restricted zone. The server computer located outside the restricted zone may determine an account associated with the unrestricted account alias and process the transaction request message. Furthermore, the server computer may generate a settlement file associated with the transaction request message including the unrestricted account alias and send the settlement file to the server computer located in the restricted zone. The server computer located in the restricted zone converts the unrestricted account alias to the restricted account identifier and send the settlement file to a mobile network operator associated with the transaction request message, and wherein the mobile network operator settles the transaction by transferring money between one or more accounts or issuers located in the restricted zone.

These and other embodiments of the invention are described in further detail below.

DETAILED DESCRIPTION

Figure 1:
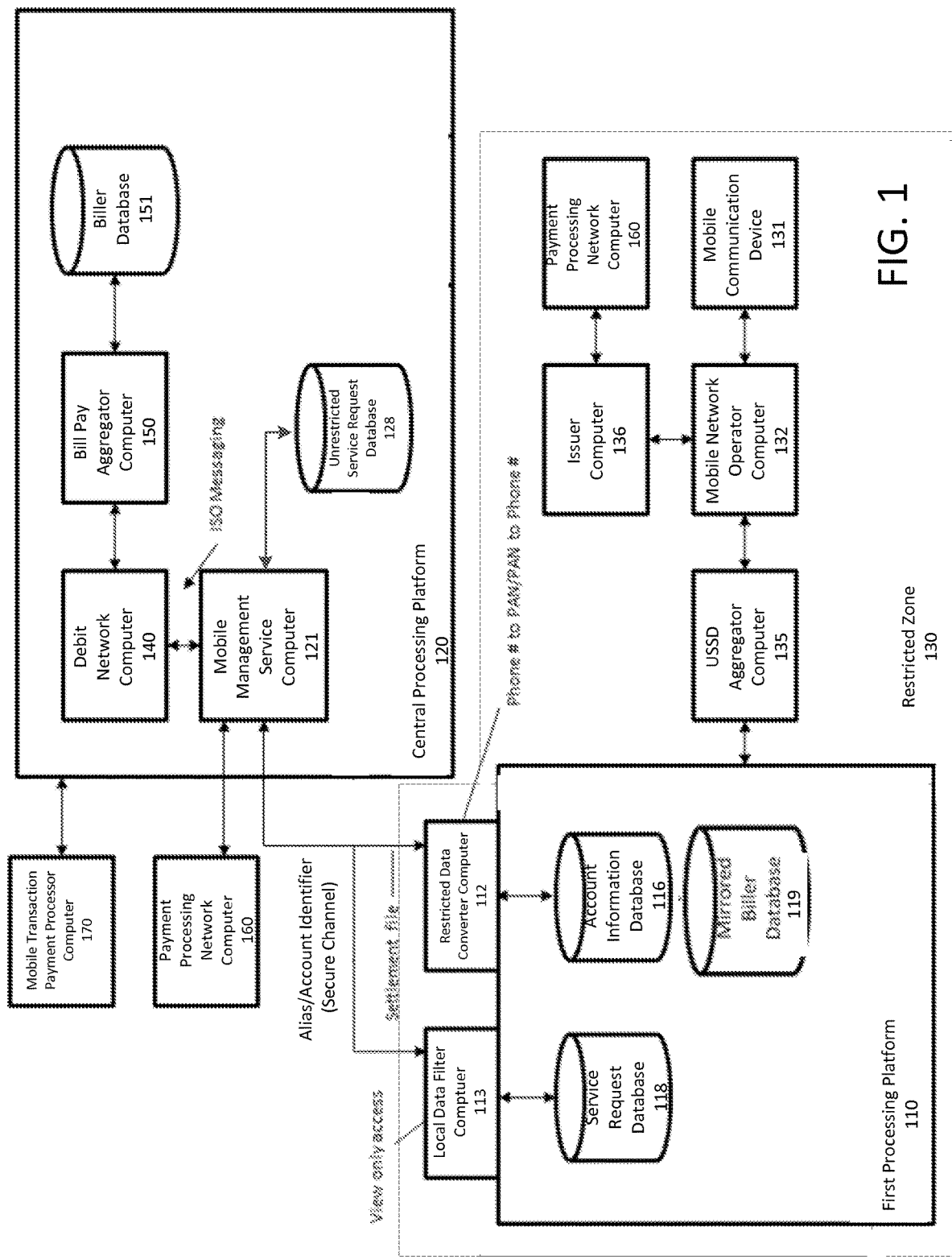
FIG. 1 shows a transaction processing system including a local data conversion system according to an exemplary embodiment of the present invention.

Embodiments of the present invention relate to data conversion and aliasing schemes that may be used when a centralized processing platform located outside of a restricted zone is used to process transactions originating in the restricted zone.

Centralized processing of transactions is desirable for a number of reasons including reducing infrastructure investment in each region as a centralized processor can provide the same processing for a number of different regions using a single platform, instead of investing in independent and repetitive platforms for each region. Additionally, centralized processing is more efficient, faster, and allows for easier management and maintenance of systems. However, due to the vast number of different regions and different restrictions implemented by each region, a centralized processing may be restricted for countries restricting information that is used in transaction processing. Accordingly, embodiments of the invention provide data conversion and aliasing schemes to allow for more efficient and effective centralized processing of transactions, service requests, and any other requests.

In embodiments of the invention, a mobile management service (MMS) system may process transactions from a central location (e.g., a centralized processing platform) and may be in communication with one or more local platforms (e.g., first processing platforms) from one or more regions (e.g., restricted zones). Each region may have a different set of rules that each local platform may implement in order to comply with the rules, regulations, and data restrictions for each region. Accordingly, in some regions, an aliasing scheme may be implemented, because some restricted data cannot leave that specific region. For example, in some regions, telephone number information cannot leave the region, but it may be inefficient and ineffective to process the transactions within the particular region. Accordingly, a central processing platform may be configured to process transactions on behalf of issuers or financial entities within the region. The central processing platform provides better processing capabilities due to the increased scale of transaction processing at the central processing platform, provides more efficient processing of transactions due to the central location of the processing platform, and provides flexibility to different regions to allow for many different solutions and the most effective processing for each region. Accordingly, an aliasing scheme may be implemented at a local platform in the region to convert the restricted telephone numbers to unrestricted account aliases when transmitting transaction information to a central mobile management service server located outside of the restricted region.

In order for the mobile management service computer, located at a centralized location (e.g., the United States of America), to be able to process a transaction, transaction data may need to be exported from the region where the transaction was initiated. However, the transaction data may include some data that is restricted from export by local restrictions, regulations, or laws and as such, the transaction data may not be allowed to be exported. Accordingly, a need exists for processes to allow transactions to be processed outside of the local platform without breaking local laws or regulations regarding restricted data. Further information regarding the capabilities of the mobile management service computer, the mobile payment transaction system, and types of transactions that may be processed by the mobile management service server computer may be found in related U.S. application Ser. No. 13/755,213, filed Jan. 31, 2013, titled "Mobile Managed Service," which is hereby incorporated by reference in its entirety, for all purposes.

Embodiments of the present invention address this problem and others by implementing a data converter which may convert restricted data to an unrestricted account identifier or account alias. For example, the data converter may convert a restricted account identifier (e.g., a telephone number) to an unrestricted account alias (e.g., a primary account number (PAN)) so that payment data and settlement communications can be routed from a first processing platform (e.g., located in a developing nation or region) to a central processing platform (e.g., located in a developed nation or region, for instance, the United States). The central processing platform may then provide more efficient and effective processing of the transaction. However, the central processing platform is not limited to a single platform, accordingly, the central processing platform may also be called a second processing platform. Similarly, a first processing platform may be referred to as a local processing platform and there may be many different local processing platforms within a single restricted zone or numerous restricted zones.

For example, for a particular payment transaction, a person located in a restricted zone may want to pay a bill with a mobile communication device (e.g., a mobile phone). A communication message (e.g., an Unstructured Supplementary Service Data (USSD) message) may be sent to the mobile management service computer (located at a central processing platform) via the mobile network operator associated with the person's mobile communication device, the USSD Aggregator associated with the mobile network operator, and a first or local processing platform.

At the local processing platform, a data converter may convert the telephone number into an alias (e.g., a personal account number, personal account identifier, or other identifier associated with a person's account) and the message can get routed to the mobile management service server computer outside the restricted zone. The message may no longer include the phone number (restricted information) and instead may identify the consumer through the alias (unrestricted information). The mobile management service at the central processing platform located outside the restricted zone (e.g., the United States) may then receive the alias which may be shared with the central processing platform or may be associated with the account information of the consumer such that the mobile management service could determine which account the alias was associated with. The mobile management service may then authenticate the account and mobile communication device, process the transaction using a mobile transaction processing platform, or route the transaction to a payment processing network for a typical debit or credit transaction, which may receive an authorization from a bank for the transaction. The central processing platform and the local processing platform may communicate in this manner as many times as necessary for a transaction processing. For example, as will be described in further detail below, separate messages may be sent in order to authenticate a consumer and/or provide biller information (or other transaction information) for a transaction to a consumer during a transaction. Accordingly, with each message a restricted information conversion (and vice versa) may occur.

Additionally, in some embodiments, the restricted data converter may convert multiple different pieces of restricted information into multiple unrestricted information for a single message or multiple messages during a transaction. The multiple pieces of unrestricted information may further be converted back into restricted information and may be transmitted to additional unrestricted and/or restricted zones. For example, if a centralized processing platform has servers in multiple unrestricted zones or has some processing capabilities split between an unrestricted zone and a restricted zone, the restricted information and unrestricted information may be converted as many times as necessary and sent to as many different platforms as necessary to process the transaction in the most efficient and effective manner possible. Accordingly, multiple pieces of restricted and unrestricted information and multiple transfers of such restricted and unrestricted information may be implemented in some embodiments of the invention.

At some later time, a settlement file may be sent from the mobile management service to the data converter, which may convert the unrestricted account alias (e.g., personal account identifier) back into a phone number. The first processing platform may then send the settlement file along with the phone number (restricted account alias) to the mobile network operator for settlement of the transaction. Depending on the responsibilities of the mobile network operator and issuers, the mobile network operator may inform the issuer of the settlement amount and the funds may be transferred to settle and clear the transaction (as well as other transactions between the mobile network operator and the issuer). Accordingly, a central processing entity may use a data aliasing and/or conversion scheme to process transactions at a central location even though the transactions were initiated in a restricted zone that limits the export of information used to process the transaction.

In another embodiment, there can be a service request database which may reside in the restricted zone. The service requests stored in the service request database may comprise restricted information. Accordingly, a local data filter located at the first processing platform may filter the restricted data to generate an unrestricted service request such that an operator located outside the restricted zone may perform the requested service.

Both the local data filter and the data converter may be specific and customized for each country connected to the central processing platform. Accordingly, the local data filter and data converter may be specific for each country or restricted zone so that the restricted data that is particular to each country may be filtered or converted during a transaction. Accordingly, the capabilities and responsibilities for each local processing platform and central processing platform for each restricted zone may be different. Therefore, a custom system may be created for each restricted zone that allows for flexibility, customization, and the most efficient possible transactions for each unique region's specific infrastructure limitations, regulations, restrictions, and/or laws. A hierarchical organization of consumer's based on geographic location (or along restricted zones) and capabilities of the local processing platform for those users may be implemented to ensure efficient processing of consumers with related or grouped transaction processing.

Prior to discussing the specific embodiments of the invention, a further description of some terms can be provided for a better understanding of embodiments of the invention.

A "transaction request message" may include any message associated with the initiation of a transaction. For example, a transaction request message may be generated and sent through a transaction processing system by a consumer using a communication device (e.g., mobile communication device), a mobile network operator computer, a service provider computer, a local processing platform computer, or any other entity during or at the initiation of a transaction. The transaction request message may be generated in order to initiate a transaction and may include any transaction information that may be used in processing a transaction by a payment processor (e.g., transaction amount, issuer (e.g., bank) identification information (e.g., BIN), an account identifier associated with the sender (e.g., a primary account number, mobile wallet identifier, personal information (e.g., name, address, social security number), email address, phone number, etc.), a recipient identifier (e.g., e.g., primary account number, mobile wallet identifier, personal information (e.g., name, address, social security number, etc.) email address, phone number, etc.), authentication credentials for a sender (e.g., personal identification number (PIN)), authentication credentials for the communication device (e.g., a cryptogram or other cryptographic identifier for authenticating the communication device used in the transaction), etc. The transaction request message may include transaction information that are not allowed to leave the local region where the transaction is initiated (i.e., restricted data), as will be described in further detail below. In some embodiments, the transaction request message may be generated once all of the required information is received or provided for a transaction. In such embodiments, other messages (e.g., authentication request messages, authentication response messages, biller request messages, etc.) may be generated, sent, and received before a transaction request message in order to obtain relevant transaction information.

A "transaction response message" may include any message associated with a response to a transaction request. For example, a transaction response message may be generated in response to a transaction request message received at a central processing platform, mobile management service server computer, or any other entity within a transaction processing system. The transaction response message may be sent through a transaction processing system including a consumer using a communication device, a mobile network operator, a service provider, a local processing platform computer, or any other entity during or after completion of a transaction. The transaction response message may be generated in order to complete a transaction and may include any transaction information that may be used in processing a transaction by a payment processor (e.g., transaction amount, issuer (e.g., bank) identification information (e.g., BIN), an account identifier, a recipient identifier, etc.) as well as any information important for settling, clearing, or managing a transaction. The transaction response message may include transaction information that may need to be converted in order for the transaction response message to be processed at a local processing platform, mobile network operator, issuer, communication device (e.g., mobile communication device), or any other entity located in a restricted zone, as will be described in further detail below.

According to embodiments of the present invention, a "transaction" may include any interaction between entities in a transaction system. For example, a transaction may include a payment transaction (e.g., bill payment, merchant payment, etc.), a physical or an electronic account credit or loading transaction, a physical or an electronic account debit or unload transaction, a transfer request (e.g., person-to-person money transfer, cross-border remittance transaction, account-to-account transfer, token-based transfer, etc.), a service request, a request for information, an authentication transaction, a cash-out transaction (e.g., ATM withdrawal, cashier withdrawal), a cash-in transaction (e.g., ATM deposit, cashier deposit), or any other interaction between two entities that may necessitate the interaction of an entity outside a restricted zone. Typical services that are performed during transactions include payment processing, settlement, disputes, audit, etc. The mobile management service computer or other computer at the centralized processing platform may complete as many of these services as possible in order to improve the efficiency and effectiveness of the transactions originating from the restricted zone.

A type of transaction that may be processed by the mobile management service server computer may depend on the entity requesting the transaction. For example, transactions for a customer may include payment processing (open loop scheme, closed loop scheme), fraud/security (fraud mitigation, fraud alerting, dual roles for payment auth.), data protection/privacy (e.g., secure storage within Visa), payment authorization (e.g., PIN for payments, PAN unlock), risk management (risk identification, mitigation, monitoring), reversal (closed loop reversals, open loop reversals, unified reversals tool). After a transaction for a customer, other activities related to the transaction may include clearing and settlement (closed loop settlement, open loop settlement, unified settlement tool), invoicing/statements, transaction analytics (closed loop analytics, open loop analytics), reconciliations, audit/reporting (closed loop analytics, open loop analytics), chargeback/reversals/disputes. Depending on the type of transaction and the requesting party, the customer may be any consumer operating a mobile communication device, a mobile network operator, a financial issuer, a USSD aggregator (or other transaction aggregator), and any other entity involved in transactions in a restricted zone.

Accordingly, transactions may be occur between a number of different parties and the services available may be determined by the entities involved in the transaction. For example, embodiments of the invention may allow for consumer-to-consumer transactions, consumer-to-business transactions, consumer-to-government transactions, business-to-consumer transactions, government-to-consumer transactions, government-to-business transactions, and government-to-government transactions. Additionally, transactions may be initiated by any device (and are not limited to mobile communication devices). For example, some devices that may be used to initiate a transaction include any computer, laptop, tablet, television, set-top box, gaming device, etc. Accordingly, embodiments of the invention are not limited to mobile communication devices and may be implemented using other systems, computers, or any entity that may benefit from the centralized processing of transactions outside of a restricted zone.

According to embodiments of the invention, "transaction information" may include any data that may be generated, used, or associated with a transaction. For example, transaction information may include a transaction amount, an account identifier for a sending account, a recipient account identifier, a type of transaction, the type of entities involved in the transaction (e.g., merchant-consumer transaction), a request for further information related to a transaction (e.g., a message directed at the type of transaction a consumer may wish to complete so that a relevant menu may be delivered), a type of payment application being used to complete a transaction, authentication credentials for a consumer, device, or electronic wallet, etc. For instance, in USSD transactions, a consumer may open a mobile application and request to initiate a type of transaction (e.g., payment, transfer, debit/unload, credit/load, etc.) and depending on the requested type of transaction, a wallet menu may be delivered to the electronic device. An actual transaction request message may or may not be generated at this point depending on the configuration of the system. However, the transaction information may be used in the transaction request message when it is generated.

A "restricted zone" or "restricted area" may include any legal or physical area where the transmission of some data is restricted. The restricted zone may be a country, state, organization, business, or government institution. For example, a restricted zone could be a state, region, or country that has insufficient infrastructure or regulates and/or does not allow the transmission of some information (e.g., mobile telephone numbers) outside of the state, region, or country.

According to some embodiments of the invention, "restricted data" or "restricted information" may include any information that is regulated or restricted in any manner within a restricted zone, area, or region. For example, restricted data may include a telephone number, email address, name, social security number, mobile wallet identifier, residential address, account identifier, bank or issuer identifier (e.g., BIN), or any other information. The restricted information may be combined in a transaction request or other message such that it may be combined with unrestricted information.

An "issuer" may refer to an institution, such as a bank, mobile network operator, or other entity that creates and maintains accounts for account holders. For example, an issuer may issue and maintain financial accounts for a consumer (such as a bank) or mobile device accounts (such as a mobile network operator), that may be used in transactions as well. For instance, in some embodiments of the present invention, the mobile network operator may provide both mobile communication services as well as financial account services in order to process payment transactions on a consumer's behalf. Additionally, the mobile network operator may interact with a traditional financial issued (e.g., a bank) in order to settle transactions or may route the financial messages (e.g., settlement files) to a financial issuer. The issuer of a particular consumer account may determine whether or not to approve or deny specific transactions. In some embodiments, an issuer may authenticate a consumer and release funds to an acquirer or mobile network operator if transactions are approved (e.g., a consumer's account has sufficient available balance and meets other criteria for authorization or authentication). Additionally, in some embodiments, a separate mobile transaction payment processor may be implemented that performs payment operations (including authentication and authorization) on behalf of mobile network operators such that the mobile network operator is the sole issuer in the transaction.

An "account identifier" may include any identifier associated with an account. For example, an account identifier can be a combination of letters, numbers, characters, or any other information that is correlated with any account. For instance, an account identifier may be associated with an account issued by an account issuer, in which funds may be requested upon by the account holder, who may be a consumer or user. Examples of suitable accounts may be checking accounts, point or reward accounts, virtual money accounts (e.g., Zynga™ dollars, Superpoke™ coins), or credit accounts.

According to some embodiments of the invention, a "restricted account identifier" may include any restricted information associated with an account. For example, the restricted account identifier may include a phone number that is not allowed to be transmitted outside of the restricted zone and identifies an account associated with a consumer who is the registered with the phone number. For example, in some regions, the restricted account identifier may be a mobile phone number of the consumer, which the first processing platform, the mobile network operator, or the USSD aggregator may use to manage and facilitate the servicing of the consumer's account or may use in a payment transaction.

An "unrestricted account alias" or "unrestricted account identifier" may include any unrestricted information associated with an account. For example, an unrestricted account alias may include any collection of numbers, letters, or words that are associated with an account and may be transmitted outside a restricted zone. For instance, the unrestricted account alias may include unrestricted information that may identify an account (e.g., a social security number that may be accessed by a party to determine an account), a pre-configured alias to represent the user (e.g., a username), personal information identifying the consumer (e.g., name, email address, etc.), an account number for the consumer that is not restricted (e.g., a mobile money account number or primary account number that is not restricted from being transmitted outside the restricted zone including an issuer identifier number (i.e., BIN)), or any other information that may be used to identify an account associated with a consumer or user.

Accordingly, in some embodiments, the unrestricted account alias may be used to determine the identity of an account associated with the consumer outside of the restricted zone. For instance, using the example above, the restricted mobile telephone number may be associated with an account number (e.g., primary account number (PAN) associated with a credit card or debit card account) stored in a database at the first processing platform. Because the phone number is restricted and cannot be transmitted, a data converter may convert the phone number to the associated account identifier (e.g., PAN) before transmitting a message to a central processing platform. Thus, the central processing platform may identify the consumer account or the consumer associated with the account using the unrestricted account identifier.

In embodiments of the invention, the use of an account identifier as an unrestricted alias is advantageous and not obvious. Typically, account identifiers are considered to be confidential information and may be tokenized, converted, or substituted during a transaction in order to protect the account identifier. However, in embodiments of the invention, the account identifier can be used as a transport mechanism to efficiently identify a consumer account and transport data to and from an unrestricted zone. Additionally, in some cases, the account identifier may be an efficient piece of information to use to identify the consumer account because the account identifier may be used in an ISO message which is normally used in typical credit and debit card transactions. Such ISO messages may be used to transport data, even though they may not be used to authorize transactions, as in typical credit and debit card transactions. Further, in embodiments of the invention, it is not intuitive that the unrestricted account identifier does not have to be used to identify an account from which money will be transferred to and from during settlement. Rather, in embodiments of the invention, the restricted account identifier is used as the primary mechanism to identify the account from which money will be transferred to and/or from during settlement instead of the unrestricted account identifier that may be used to complete the transaction at the central processing platform. Accordingly, embodiments of the invention provide more flexible systems that allow for different payment and settlement processes depending on the capabilities, infrastructure, and sophistication of the local processing platform and the nature of the restrictions of the restricted zone.

In embodiments of the invention "converting" may include any process or method of substitution, replacement, or mapping of one piece of information for another. For example, in embodiments of the present invention, a restricted account identifier may be converted to an unrestricted account alias such that the restricted account identifier in a transaction request message is replaced or substituted with an unrestricted account alias such that the transaction may be transmitted outside of a restricted zone. However, the unrestricted account alias may be mapped to a consumer account or otherwise identify the consumer such that the correct account may still be determined for processing of a transaction outside of the restricted zone.

A "restricted service request" may include any request associated with a service that includes restricted data that may not be transmitted outside of a restricted zone. For example, if a mobile network operator is having technical difficulties and a service request is generated for a service entity to service or repair some aspect of the mobile network operator's service outside of the restricted zone, the mobile network operator may include some mobile phone numbers that are causing technical difficulties in the service request. However, using the example above, the mobile phone numbers are restricted and if the restricted service request was to be sent for service outside of the restricted zone, the regulations would be violated. Accordingly, the service request may be a restricted service request because the mobile telephone number is restricted data.

An "unrestricted service request" may include any request associated with a service that does not include restricted data. Accordingly, the unrestricted service request may include a service request or message comprising service information that has had all of the restricted information or data from the restricted service request filtered, so that no restricted information is contained in the unrestricted service request. The definition of restricted information may change depending on the restricted zone where the transaction or service request takes place so the restricted information that is filtered may change depending on the restricted zone.

In embodiments of the invention "filtering" may include any method of removing data from a file, record, or message. For example, restricted information may be filtered from restricted service requests or any other data, records, or messages that comprise restricted information. As such, the filtering may be the reproduction of the underlying data without the restricted information included or could be a blocking of the restricted information from being written, reproduced, or copied by parties outside the restricted zone. However, according to some embodiments of the present invention, some filtered data may be able to be passed outside a restricted zone using "read only access" functionality. The read only access may include a non-reproducible transfer of data such that the underlying restricted data is not reproduced outside of the restricted zone. Accordingly, some regulations do not allow copying, storing, or reproducing restricted data outside the restricted zone but may allow a system to view the data or otherwise access the restricted data as long as it is in a "read only" or view only access mode, and the data is not reproduced. Similar processes may include remotely accessing a computer inside the restricted zone using a virtual private network (VPN) or otherwise allowing a computer outside a restricted area gain access to information inside the restricted area without requiring reproduction, caching, or storing of the restricted information outside the restricted zone.

A "processing platform" may be a server computer or group of server computers configured to process transactions. The processing platform may provide a number of services and may process many different types of transactions (mobile payment, authentication, fraud monitoring, reporting, application support, service request processing, biller determination, etc.). Processing platforms may be located in a central location outside of a restricted zone (central processing platform) or may be located inside a restricted zone (local processing platform).

A "settlement file" may include any file, message, or information associated with clearance and/or settlement of a transaction. For example, the settlement file may be created during the processing of a financial or payment transaction. For a payment transaction, the settlement file may include, among other information, an invoice amount (gross amount), the transaction fee, and the net amount (the gross amount minus the transaction fee and other specified fees, if any) of the transaction. The settlement file may be used during a clearance and settlement phase of payment processing where the financial entities are informed of what final transfers of monetary value should be accomplished to complete the transaction.

I. Exemplary Systems

FIG. 1 shows a transaction processing system 100 including a local data conversion system according to an exemplary embodiment of the present invention. Although FIG. 1 shows an exemplary embodiment where a payment transaction occurs using a mobile USSD mobile payment application in a restricted zone 130, the process could be implemented for any type of transaction and could occur in any two areas where data is restricted from being sent from one area or zone to another. For example, the transaction could be a service request where consumer information is contained therein whose transfer is restricted as well as any other transaction where regulated information may be required for processing the service request outside the allowed area.

The exemplary transaction processing system 100 comprises a first or local processing platform 110 in a restricted zone 130 that may communicate with a central processing platform 120. The restricted zone 130 may include any region, city, state, country, organization, or other physical or legal area where information may be restricted from export. Within the restricted zone 130 there may be consumers, merchants, load-agents, or any other operators of mobile communication devices 131, mobile network operator computers 132, issuer computers 135, connections with a payment processing network computer 160, and a first or local processing platform 110.

A mobile communication device 131 may include any mobile device that is configured to communicate with another device, computer, system, or apparatus. The mobile communication device 131 may be in any suitable form. For example, suitable devices can be hand-held, compact, mobile, and enabled to communicate over a network interface (e.g., a mobile phone, smartphone, etc.), and may have an associated device identifier (e.g., mobile telephone number). Examples of devices include cellular phones, PDAs, personal computers (PCs), tablets, smartphones, and the like. The mobile communication device may be operated by a consumer, load agent, merchant, or any other entity that may wish to participate in or complete a transaction.

The mobile network operator computer 132 may be a computer or group of computers that provide services to consumers operating mobile communication devices. The services provided by the mobile network operator 132 may include mobile payment generation using the mobile communication device 131 as well the connection and processing of typical communication functionality (phone calls, text messages, etc.). As such, the mobile network operator 132 may need to communicate with an entity that aggregates payment requests from a number of different mobile network operators (i.e., USSD aggregator 135) so that a mobile network operator 132 may only have a single contractual relationship with a single entity in order to allow payment transactions with their mobile network.

The USSD aggregator computer 135 may be a computer or group of computers that pool or group many different payment transaction requests from different mobile network operators 132 and facilitate the processing, clearance, and settlement of payments originated using a mobile communication device 131 on the mobile network operator's 132 communication network.

An issuer computer 136 may include any computer or group of computers operated by a financial issuer. In some instances the issuer computer 136 may be operated another mobile network operator (not shown) that manages accounts outside of the mobile network operator computer 132 or may be operated by a tradition financial issuer 136 (e.g., bank). The issuer computer 136 may communicate with the mobile network operator computer 132 in order to settle financial transactions that are initiated between consumers with accounts associated with the issuer 136 and other mobile network operators, issuers, mobile transaction payment processors 170 (e.g., Fundamo™), or any other entities involved in mobile payment transactions.

A payment processing network 160 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 160 may include one or more server computers (e.g., central server) which may have computer readable medium comprising code for performing functions that a payment processing network performs. A "server computer" or "server" is typically a powerful computer or cluster of computers. For example, the server computer may be a large mainframe, a minicomputer cluster, or a group of servers functioning as a unit. In one example, the server computer may be a database server coupled to a Web server. The payment processing network 160 may use any suitable wired or wireless network, including the Internet. One or more databases may be operatively coupled to the server computer.

The first or local processing platform 110 may include a local processing platform server computer (not shown) or a group of local server computers that are located in a restricted zone 130 or region. The first processing platform 110 may comprise a restricted data converter computer 112, a local data filter computer 113, an account information database 116, a restrictions database 117 (not shown), a service request database 118, and a mirrored biller database 119 (optional).

Figure 2:
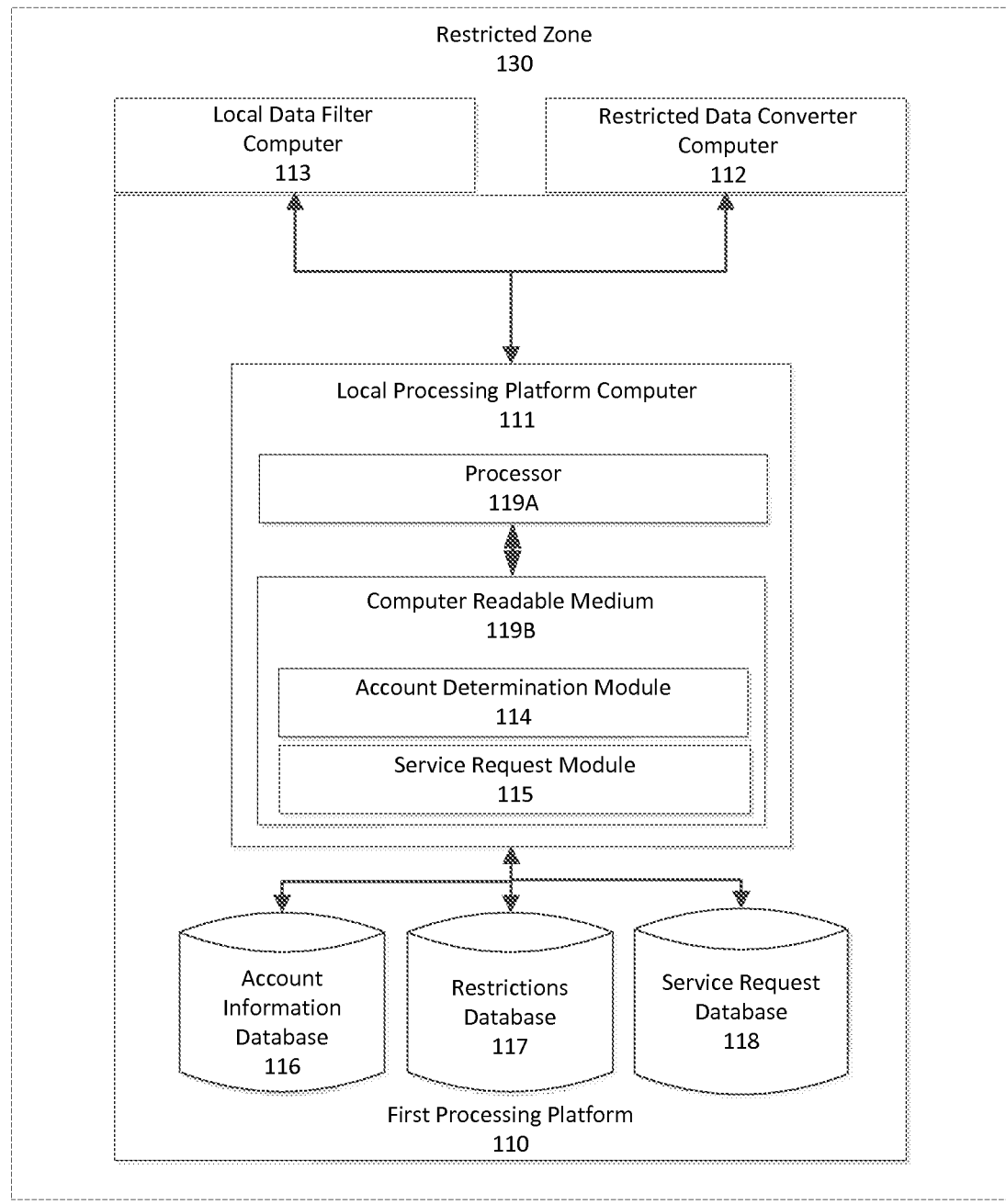
FIG. 2 shows a local processing platform of a transaction processing system located in a restricted zone, according to an exemplary embodiment of the present invention.

FIG. 2 shows a local processing platform of a transaction processing system located in a restricted zone in more detail. The local processing platform 110 may comprise a local processing platform computer 111 comprising a processor 119A and a computer readable medium 119B that may comprise an account determination module 114 and a service request module 115. Although not shown in FIG. 2, in embodiments where the local processing platform computer 111 may authenticate, determine a biller, and complete preliminary transaction request functionality, the local processing platform 110 may comprise modules to complete this functionality as well. Accordingly, depending on the data restrictions of the restricted zone 130, the local processing platform computer 111 may comprise addition modules (or fewer modules), as one of ordinary skill in the art would recognize.

A local processing platform computer 111 may be configured to process and orchestrate a transaction between the local processing platform and the central processing platform 120. The local processing platform computer 111 may be separate from the restricted data converter computer 112 and/or the local data filter computer 113, or these separate computers may be incorporated into the local processing platform computer 111 as modules.

The restricted data conversion computer 112 may be configured to convert restricted data into unrestricted data. For example, the restricted data converter computer 112 shown in FIG. 2 may be used to convert restricted account identifiers associated with an account to an unrestricted account alias or other unrestricted alias that is associated with the consumer's account. The data converter computer 112 may be located within a restricted zone 130 and may have a restricted information file stored in a restrictions database 117 or other rule set that informs the data converter computer 112 of what type of information is restricted and needs to be converted. As such, the data converter computer 112 may be implemented in any other restricted zone (not shown) and the restrictions database 117 may be changed for each restricted zone 130. In the embodiment shown in FIG. 2, the restricted data converter computer 112 may receive a message from the local processing platform computer 111, may determine the restricted information within the message using the restrictions database 117, and may convert the restricted information into unrestricted information. The unrestricted information may be provided by the local processing platform computer 111 or may be determined by analyzing the account information database 116 independently of the local processing platform computer 111.

For example, the local processing platform computer 111 may receive a transaction request comprising a restricted account identifier (e.g., a phone number) and use an account information database 116 to determine an account associated with the restricted account identifier. The local processing platform computer 111 may then work with the restricted data converter computer 112 to replace, substitute, or convert the restricted account identifier in the transaction request message with the unrestricted account alias and forward the updated transaction request to a mobile management service server computer or any other server computer located outside the restricted zone 130 for data processing.

The restricted data converter computer 112 may also convert unrestricted data to restricted data when receiving unrestricted account aliases or other unrestricted data that the restricted data converter computer knows should be exchanged for the restricted data. The restrictions database 117 or the account information database 116 may maintain a record of information that the restricted data converter computer 112 should exchange so that the restricted data converter computer 112 may determine unrestricted data that should be substituted with restricted data. For example, the restricted data converter computer 112 may receive a settlement file comprising an unrestricted account alias (e.g., a PAN) and may substitute the alias information for a restricted account identifier (e.g., phone number) so that the mobile payment network may process the settlement file without violating PCI compliance requirements or requiring updated infrastructure at the mobile network operator, USSD aggregator, etc.

An account information database 116 may include a database comprising account information for consumers that are registered to process payments through their mobile devices using the local processing platform 110. Registration may occur through any suitable process including direct contact with the consumer or mobile network operators 132 may automatically register their consumers with the first processing platform 110. The account information database 116 may comprise payment information, authentication information, contact information, account information, and any other information that the mobile network operator 132, USSD aggregator 135, or the consumer operating the mobile communication device 131 may provide the mobile management service computer 121 or the local processing platform computer 111.

In some embodiments, the restricted data converter computer 111 may be coupled to one or more databases including a mirrored biller database 119 (which may be a mirror of a database managed, updated, and controlled from the central processing platform). The restricted data converter computer 112 may be located at a first processing platform 110 or may be located and managed by a third party outside the first processing platform. Additionally, the restricted data converter computer 112 may be located inside the restricted zone 130 so that no further processing of the restricted information is necessary.

The mirrored biller database 119 may include a database of biller information that may be used to determine which billers, payment recipients, or other contacts are available for performing transactions through a consumer account with a mobile managed service computer 121, mobile network operator 132, or USSD aggregator 135. The biller database 151 may be located outside the restricted zone 130, however, in some embodiments where the local processing platform 110 may complete transaction processing steps including user and device authentication, recipient or biller availability, or other processing tasks, the first processing platform may maintain an active copy or mirror of the biller database 151 on the local processing platform as well, in the form of a mirror biller database 119. Accordingly, the mirrored biller database 119 may be managed by the mobile management service computer 121, a bill pay aggregator computer 150, or other third party located outside the restricted zone 130. However, the mirrored biller database 119 may be provided to the first processing platform 110 in order to speed up processing times for transactions by allowing the first processing platform 110 to determine available billers without having to communicate with the mobile management service computer 121 located at the central processing platform 120. Accordingly, in some embodiments, the consumer operating the mobile communication device 131 may receive a message of available billers without any communication with the central processing platform 120 being necessitated before the transaction request message is generated.

The local processing platform computer 111 may also comprise a service request module that may be used to process, service, and facilitate the performance and completion of service requests. The local processing platform computer 111 may interact with a local data filter computer 113 (or the local data filter computer 113 may be incorporated into the local processing platform computer 111). The local data filter computer 113 may include any computer program, analog hardware device, computer readable medium comprising instructions to filter data, or any other device that is capable of receiving data and determining whether that data is restricted. If the data is restricted, the local data filter computer 113 may remove or filter the restricted information through any suitable method. For example, the local data filter computer 113 may block any data from a data request sent from the third party who is located outside the restricted area. Alternatively, the local data filter computer 113 may reproduce all of the data except for the restricted information and send the data to a database for storing of unrestricted service requests or other data records. Accordingly, the local data filter computer 113 may ensure that restricted data is not transmitted outside of a restricted area but still allows data transfer and servicing by entities outside of the restricted area.

Depending on the type of restrictions implemented by the restricted zone 130, the local data filter computer 113 may be programmed to filter restricted information while passing on unrestricted information to the mobile management service computer located outside the restricted zone 130. The local data filter 114 may either send the unrestricted data to the central processing platform 120 located outside the restricted zone 130 or may merely allow "view only access" to the service request database 115 comprising restricted service requests. Therefore, the local data filter computer may allow the mobile management service computer 121 access to restricted service tickets stored in a service request database 118 without creating a record at the central processing platform 120 or requiring the transmission of restricted data outside the first processing platform 110. Furthermore, the local data filter computer 113 may allow for remote viewing of restricted information such that the information may not be reproduced or stored outside the restricted zone but may be accessed by an operator located outside the restricted zone. An operator may then provide a service associated with the service request from a central processing platform without storing, reproducing, or using the restricted information from outside the restricted zone.

A service request database 118 may be coupled to the local processing platform computer 111 or the local data filter computer 113 and may include a database of consumer information, service desk requests, or other service associated information generated in response to a service request or other issue. A service request database 118 may comprise information related to service requests including on-boarding of users with the system, trouble tickets related to problems with the system, and the like. The service request database 118 may be managed by the first processor platform 110 or may be managed and located by a third party within the restricted zone 130.

Figure 3:
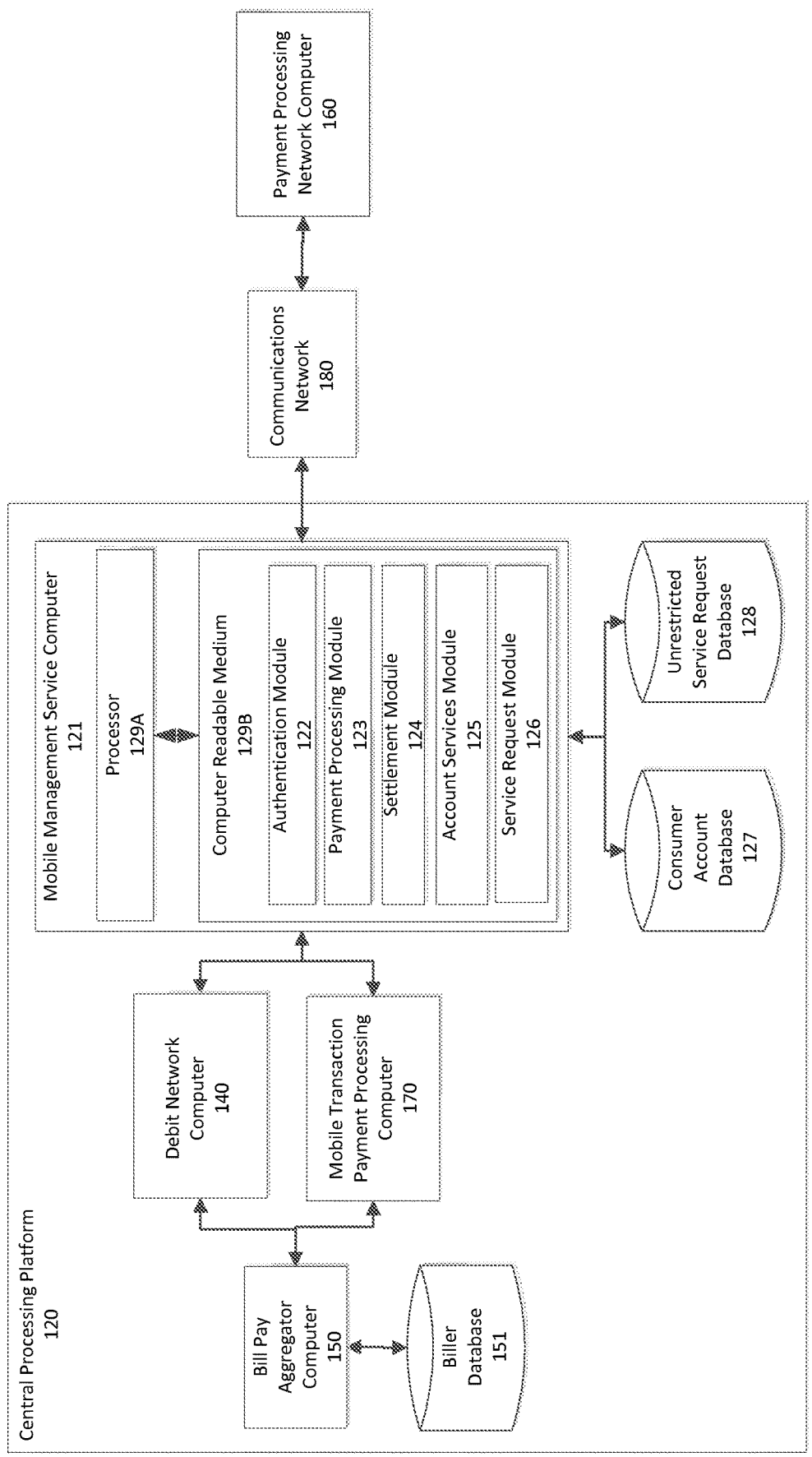
FIG. 3 shows a centralized processing platform of a transaction processing system located outside a restricted zone, according to an exemplary embodiment of the present invention.

FIG. 3 shows a centralized processing platform 120 of a transaction processing system 100 located outside a restricted zone 130, according to an exemplary embodiment of the present invention. The central processing platform 120 may be a server computer or group of server computers located outside the restricted zone 130. The central processing platform 120 may be used to process transactions originating from the restricted zone 130 because it may be more efficient to centralize processing of transactions in a central location or a smaller number of processing centers than within each restricted zone 130. The hardware, software, support, and other necessities of providing transaction processing services may be more efficiently provided in one or a small number of locations instead of reproducing services for each restricted zone 130. The central processing platform 120 may comprise a mobile management service computer 121, a debit network computer 140, a bill pay aggregator computer 150, a biller database 151, a consumer account database 127, and an unrestricted service request database 128. The local processing platform and the central processing platform may communicate through secure communication channels using any suitable communication standard.

The mobile management service computer 121 may provide a number of services for processing transactions between, for example, a merchant or agent's phone and a consumer's phone. The service may incorporate a number of different services to manage this process including settlement, fraud, gateway, authorization, fees, billing, and disputes. The mobile management service 121 (MMS) may be operated by a payment processing network 160 or other processing entity on behalf of various Issuers (i.e., banks 136) and mobile network operators 132. The mobile management service computer 121 may comprise a processor 129A and a computer readable medium 129B that may include an authentication module 122, payment processing module 123, settlement module 124, an account services module 125, and a service request module 126.

The authentication module 122 may include any suitable software module that may be used, in conjunction with a processor, to authenticate a consumer, a consumer's account, and/or a mobile communication device during a transaction. For example, in some embodiments of the present invention, a personal identification number (PIN) may be submitted with a transaction request message when a transaction is initiated. Accordingly, the authentication module 122 at the mobile management service computer 121 may authenticate the consumer by comparing the received PIN to a PIN stored in the consumer account database 127. Similar authentication may be performed for a mobile communication device, mobile wallet account, consumer's account, etc. In some embodiments, the authentication module may be located at the local processing platform and the authentication may be performed before sending a transaction request message to the central processing platform 120.

The consumer account database 127 may include any database comprising account information for consumers that are registered with the mobile management service computer or local processing platform. Due to the restricted nature of the restricted account identifier, the consumer account database may not comprise the restricted information. The consumer account database 127 may comprise the same information as the account information database 116 of the local processing platform 110 (except for any restricted information) or may include information specific to the tasks that are performed at the central processing platform (e.g., only authentication and payment processing information). Registration may occur through any suitable process including direct contact with the consumer or the local processing platform may automatically forward consumer information when the consumer registers for the service at the local processing platform. The account information database 116 may comprise payment information, authentication information, contact information, account information, and any other information that the mobile management service computer, central processing platform, the mobile transaction payment processor, the debit network, the bill pay aggregator, or the payment processing network may need to complete a transaction.

Additionally, the consumer account database may organize consumer information according to an organizational hierarchy based on the restricted zone they are associated with. For example, consumers could be grouped geographically, according to restricted zone. Additionally, if certain restricted regions have particular restrictions, the consumers from those regions could be grouped similarly. The hierarchical organization could impact reporting procedures, control systems, and transaction processing such that a more efficient transaction processing organization may be realized at the central processing platform. For example, the processing capabilities and abilities of the central processing entity may be limited by the amount and type of data that a central processing entity is capable of receiving. If certain restricted zones contain similar restrictions on some types of data, the transaction processing capability for these consumers could be separated from other uses such that the most efficient organization of consumer information and centralized processing capabilities could be realized.

A payment processing module 123 may include any suitable software module that may be used with a processor to process a transaction associated with a transaction request message. The payment processing module may coordinate payment through a typical payment processing network computer 160, a debit network computer 140, or through a mobile transaction payment processing computer 170.

The settlement module 124 may include any suitable software module that may be used with a processor to settle one or more transactions between entities in payment system. For example, the mobile management service computer may use the settlement module to generate a periodic settlement file that may be sent to the local processing platform in order to settle and clear transactions performed using the local processing platform. The settlement module 170 may also perform traditional settlement procedures sent through a payment processing network computer 160.

The account services module 125 may include any suitable software module that may be used with a processor to provide account services including account registration, client on-boarding, or any other services related to the mobile payment service.

The service request module 126 may include any suitable software module that may be used with a processor to provide reporting functionality, application support functionality, and/or service request services. The mobile management service computer 121 (also referred to as a mobile management server computer) may provide any one of these services or may facilitate the servicing of the requests by operators located outside the restricted zone 130. Accordingly, the mobile management service computer 121 may provide the necessary connections to allow for outside network monitoring, application stack status, and troubleshooting. Application support services may provide support for payment applications that are having technical or other difficulties. Service request services may be provided by the mobile management service 121 located at the central processing platform 120 and may comprise a customer service team that may provide a ticket management system capable of handling service requests for issues raised against the service. These services require information in the form of service requests and may use the unrestricted service request database 128 to provide the services or may use "view only" access to the service request database located at the first processing platform in order to provide the requested services.

An unrestricted service request database 128 may include any database comprising unrestricted service requests that have had any restricted information filtered from the service requests using the local data filter computer 113 of the first processing platform. Unrestricted service requests may be stored by the mobile management service computer 121 at the unrestricted service request database 128 after being filtered by the local data filter computer 113. The service requests may be serviced by the mobile management service 121 or other operators (i.e., customer service representatives) at the central processing platform 120.

The debit network computer 140 may be any number of computers at any number of entities that are configured to process and provide debit services for payment transactions. One of ordinary skill in the art would recognize the vast number of debit network 140 providers available and methods of processing such payments.

The mobile transaction payment processing computer 170 may include a mobile payment processing service (e.g., Fundamo®) that may be accessed to process and manage mobile payments.

The bill pay aggregator computer 150 may be one or more entities that provide bill pay services for mobile payment transactions. The bill pay aggregator computer 150 may be similar to other acquirers or aggregators that pool and process many transactions through relationships with debit network providers 122 and mobile transaction payment processing services 170. The bill payment aggregator may be an entity that aggregates utility bills (e.g., power, water, gas, TV, etc.). The mobile management service computer may communicate with a bill pay aggregator in order to indicate that an individual has paid a bill for a particular account (and thus, send a credit to the utility that the bill has been paid).

The biller database 151 may comprise a list of billers that are qualified or capable to bill the transaction for the consumer. Billers may be limited by geographic area, mobile network operator 132, region or area where the transaction occurs, etc., and as such, the available billers may change on a regular basis. Accordingly, transaction authentication and processing includes providing a list of billers to the consumer. In order to determine the list of billers, the mobile management service 121 may pass on the transaction information to the debit network 140 or mobile transaction payment processing computer 170 which may determine a bill pay aggregator 150 that is applicable for the debit network 140 and/or mobile transaction payment processing service 170. The bill pay aggregator 150 may then determine the available biller from the biller database 151 and send the biller information back to the mobile management service 121. Similar databases may be generated for recipients of mobile payments, ATM networks that may allow cash-in or cash-out transactions, or any other information that may be relevant for processing transactions.

The communications network 180 may be instituted using any communications protocol and any series of hardware or software applications that are necessary in order to transmit messages, information, phone calls, SMS, USSD, or any other packets of information may be transmitted between two entities. The communications network 180 may be the internet, a cellular phone network, or any other type of communications network that devices may connect to. The payment processing network 160 may be any suitable payment processing entity as defined above. Additionally, although not shown in the figures, a communications network may exist between the entities inside the central processing platform and the existence of the services within the platform may only show that a service is requested or accessed through the processing platform, using a communications network 180.

The mobile management service computer 121 may be configured to communicate via any suitable communication medium, using any suitable communication protocol. Examples of communication channels include SMSC (SMS, STX, Aggregator), USSD, HTTP1, CSS HTTP2, Top-Up/IN Platform, remittance provider, bill payment aggregator, bank, FX, VOL, and VisaNet®.

SMSC (short message service center) includes various mobile channels. SMS (short message service) is a standard text messaging service. STK is the SIM tookit that allows embedding of menus and authentication into a mobile devices SIM card itself. An aggregator (e.g., USSD aggregator) may be used to support multiple channels or go across multiple MNOs, or SMS and USSD. USSD (unstructured supplementary service data) is another message format for mobile phones.

HTTP1 and HTTP2 may be standard internet channels. HTTP1 may be an m-commerce channel such as a mobile website. CSS HTTP2 may be through a help desk or secure web channel.

The Top-Up/IN platform allows the mobile management service computer 121 to send and receive messages indicating that an account has been debited money or airtime to top up the money or air time in the account. A remittance bill provider (not shown) may allow a consumer to send cash to an account (e.g., a mobile wallet) similar to a MoneyGram or Western Union wire transfer.

The bank integration channel allows the mobile management service computer 121 to move money from a user's existing account (e.g., debit account, savings account, etc.) into a mobile wallet account and vice versa. This allows the mobile payment system 30 to move funds from existing off-platform accounts into a mobile wallet and back out again.

FX allows the mobile management service computer 121 to receive real time foreign exchange rates for transactions using different currency (e.g., a consumer using Rwandan francs to pay for a purchase at a merchant whose account is in South African rands).

VOL (Visa online) allows the mobile management service computer 121 to access the Visa online service. The extended access server (EAS) allows the mobile management service computer to access a payment processing network such as VisaNet (e.g., for authorization, settlement, routing of some transactions, etc.).

The capabilities and functionality included in each processing platform may be similar or different depending on the local processing platform's configuration, the type of information that is restricted inside the restricted zone, and any other details related to a particular regions processing of transactions. Typically, the central processing platform 120 may be responsible for and maintain the majority of the transaction processing capabilities and the local processing platform 110 may be responsible for converting or aliasing restricted data, interacting with local processing entities (e.g., acquirers, mobile network operators, issuers, mobile communication device, etc.). However, depending on the type of transaction requested, the type of restricted data in the restricted zone, and the type of payment infrastructure in the restricted zone 130, the capabilities and responsibilities of the local processing platform and the central processing platform may change, be customized, and may include any suitable combination of services (e.g., authentication may occur at the local processing platform 110 and payment processing may occur at the central processing platform 120).

II. Exemplary Methods

Embodiments of the present invention may be used to process any type of transaction that may involve data that may be limited from export of a restricted zone. However, an exemplary method is described below in the context of processing a mobile payment transaction. However, embodiments of the present invention are not limited to such and any flow specific steps should be interpreted as limited to the example herein, without limiting the capabilities of embodiments of the present invention, as one of ordinary skill would recognize.

A. Transaction Processing

Figure 4:
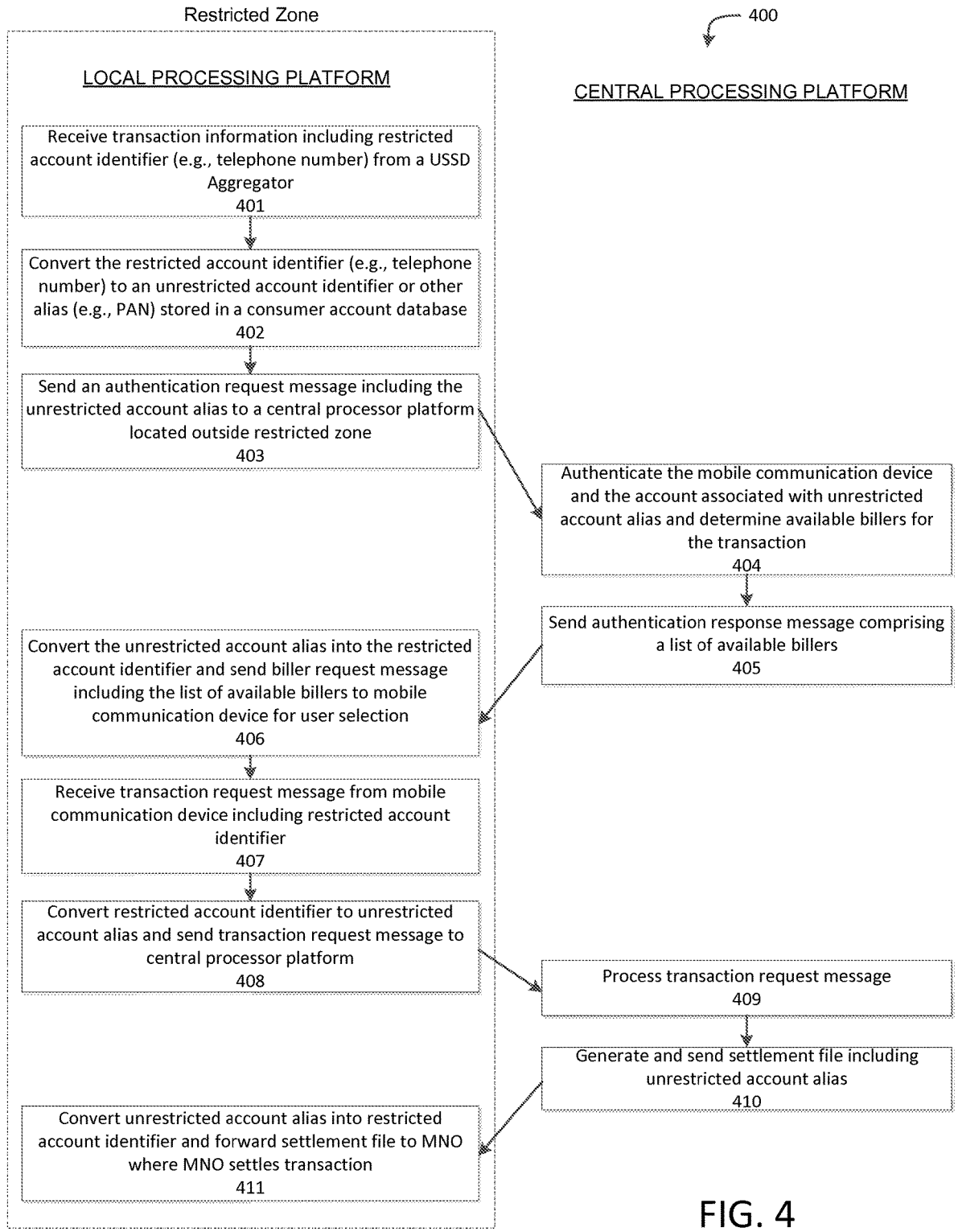
FIG. 4 shows an exemplary method of processing a transaction originating in a restricted zone using a centralized processing platform and a local processing platform using a restricted data converter, according to an exemplary embodiment of the present invention.

FIG. 4 shows an exemplary method 400 of processing a mobile payment transaction originating in a restricted zone using a centralized processing platform 120 and a local processing platform 110 including a restricted data converter computer 112, according to an exemplary embodiment of the present invention. Although the method is described in reference to a mobile payment transaction, any transaction comprising the use of restricted data that may not be transmitted outside of a restricted area could be implemented, as one of ordinary skill in the art would recognize. For example, similar processes could be applied for value added services including coupon and offer services, authentication only transactions, or any other possible transaction processing that may be aided through centralized transaction processing.

Because the exemplary method described in reference to FIG. 4 is directed at a mobile transaction being accomplished through the use of a USSD communication channel, some of the steps provided here may be repetitive or unnecessary in transactions using other transaction channels, applications, or other processing methods. For example, transactions using other communication protocols may not implement a separate authentication request message, authentication response message, or biller request message. Further, other communication protocols may implement even more messages between the local processing platform and the central processing platform.

In an exemplary mobile payment transaction using, for example, USSD messages, a consumer operating a mobile communication device may launch a mobile payment application on their mobile communication device. The mobile payment application may implement a payment service using USSD or any other messaging protocol as one or ordinary skill would recognize. The consumer may initiate the transaction entering recipient information, amount, and any other required and optional transaction information into the USSD payment application. The mobile communication device may then generate transaction information and send a message to a mobile network operator associated with the mobile communication device. The mobile network operator may receive the transaction information (which may be in the form of a transaction request message or merely a request for information so that a transaction request message may be generated later, depending on the type of application and processing methods being implemented by the mobile payment application, mobile network operator, USSD aggregator, and first processing platform. The transaction request message may include the transaction information as well as information about the device originating the request (e.g., phone number, customer number, model/serial number, etc.). When receiving the transaction request message, the mobile network operator may determine the type of transaction (e.g., bill pay, person-to-person money transfer, etc.) and may forward the transaction request message to the appropriate transaction aggregator (e.g., USSD aggregator) associated with the mobile payment application or account being used by the consumer.

The USSD aggregator computer associated with the mobile network operator may then receive the transaction request message and may determine the appropriate local processing platform to transfer the transaction request message to for processing (i.e., the first processing platform 110). Processing the transaction may then begin for the first (i.e., local) processing platform 110 located in the restricted zone 130. Note that although the transaction aggregator is named a USSD aggregator in this exemplary embodiment showing transaction processing for mobile transactions using a USSD channel, the transaction aggregator may be configured to process any suitable messages, through any suitable transaction protocols or channels.

In step 401, the first processing platform 110 located in a restricted zone 130 receives transaction information including a restricted account identifier (e.g., the consumer's phone number) from the USSD aggregator computer 135. In order to allow for more efficient and effective transaction processing, the first processing platform may be configured to send transaction information to a central processing platform to allow the central processing platform complete as much of the transaction processing for the transaction as possible. However, in order to comply with local regulations of the restricted zone where the first processing platform 110 and the communication device is located (e.g., country, state, secure location, or other legal jurisdiction), the restricted account identifier (and thus the transaction information in its current form) cannot be transferred outside the restricted zone.

Accordingly, in step 402, the first processing platform computer 111 converts the restricted account identifier (e.g., in this case a phone number) to an unrestricted account alias using the restricted data converter computer 112. For example, the first processing platform computer 111 may receive a transaction request message from a consumer with a phone number 800-111-1111 and may search a local database for a predetermined account number associated with the phone number (e.g., credit card number associated with the phone number). The unrestricted account alias may be meaningful or recognizable information or may be randomly preselected information that is shared between processing platforms. For example, during a registration phase the first processing platform computer 111 may have forwarded the unrestricted account identifier to the mobile management service computer 121 and the mobile management service computer 121 may have stored the information in the consumer account database 127 as being associated with a particular account number. Accordingly, the unrestricted account identifier may be mapped to the consumer's account.

In step 403, the first processing platform computer 111 generates and sends an authentication request message including the unrestricted account alias to the mobile management service computer 121 at the central processing platform 120 located outside the restricted zone 130. The authentication request message may be used to authenticate a consumer, communication device, payment application, or any other entities associated with the received transaction information. The authentication request message may include transaction information received from the communication device or, in some embodiments, the local processing platform may ask for specific authentication information from the communication device (e.g., through challenge response messaging, PIN or password request, etc.). The authentication request message may include all of the transaction information or may merely include authentication credentials included in the transaction information (e.g., consumer credentials (e.g., PIN), communication device credentials (e.g., CVV or dCVV cryptogram) or identification information (serial number, model number, etc.), and/or payment account credentials) or received later. The authentication request message may be sent through any suitable method including a single message, multiple messages, or any other manner as one or ordinary skill in the art would recognize.

In step 404, the mobile management service computer 121 located outside the restricted zone 130 authenticates the account and/or the consumer associated with the unrestricted account alias and determines available billers for the transaction request. The mobile management service computer 121 may receive the transaction request message and determine the unrestricted account identifier or alias from the transaction request message. In some embodiments, the unrestricted account identifier or alias may be an account number in which case no further conversion is required. However, in other embodiments, the unrestricted account identifier may be encrypted in some manner or the alias may need to be converted to an account identifier. Either way, the mobile management service computer 121 may determine the appropriate consumer account associated with the unrestricted account identifier and may accomplish any one of the numerous services the mobile management service undergoes to authenticate, ensure the transaction is not fraudulent, and determine the appropriate next steps for processing the transaction. This processes may include validating a mobile wallet account number with a mobile transaction payment processing computer 170, validating a PIN received in the transaction request message with the PIN stored in the consumer account database associated with the unrestricted account identifier, and any other authentication or processing tasks. Once the mobile management service authenticates that the transaction request originated from an authentic consumer, the mobile management service may determine the appropriate list of billers by sending the transaction information through a debit network 140 which is in communication with a bill pay aggregator 150 that has access to a biller database 151 and can determine the available billers for the transaction.

In step 405, the mobile management service computer 121 generates and sends an authentication response message comprising a list of available billers to the first processing platform 110. The mobile management service computer 121 receives the list of available billers from the bill pay aggregator computer 150 and debit network computer 140 that is available for the transaction. Once the mobile management service computer 121 receives the list of available billers, the mobile management service 121 generates an authentication response message comprising the list of available billers including the transaction information that is sent back to the consumer so the consumer can determine which biller they would like to process the transaction through. This message may be called an authorization response message or a biller request message or two separate messages may be provided. Accordingly, the authentication response message or the biller request message is transmitted back to the first processing platform computer 110 from the mobile management service computer 121.

In some embodiments, a mirrored biller database 119 may be located at the first processing platform 110 so that the list of available billers may be determined at the local processing platform 110. As such, the transaction could be accomplished quicker with fewer messages and conversions being required. In such embodiments, the authentication process may be accomplished at the first processing platform or the preferred biller determination may occur separate from the authentication process.

In step 406, the first processing platform converts the unrestricted account alias into the corresponding restricted account identifier (e.g., phone number) using the restricted data converter computer 112 and sends the authentication response message comprising the list of available billers to the consumer's mobile communication device in the form of the biller request message. The biller request message may comprise an indication of the biller, the terms (e.g., fees, tax, etc.) of using that biller, or any other useful information related to the transaction. The biller request message may also comprise an indication of whether the authentication was successful. As explained above, these messages may also be sent separately from the central processing entity and subsequently to the consumer or they may be combined into a single message.

In step 407, the consumer selects a preferred biller using their mobile communication device 131 and a transaction request message is generated and sent to the first processing platform computer 111. The transaction request message may comprise the transaction information originally sent to the local processing platform with the addition of the selected biller. The transaction information may comprise restricted account information (e.g., the mobile telephone number) or restricted account identifiers that may not be transmitted outside of the restricted area 130. Accordingly, the transaction request message may not be transmitted outside the restricted zone or area without converting the restricted account information or identifier (i.e. phone number) back into the unrestricted account alias. In some embodiments, depending on the mobile payment application and other infrastructure of the system, the selected biller may be returned to the first processing platform and the first processing platform computer may generate the transaction request message instead of the mobile communication device.

In step 408, the first processing platform computer 111 uses the restricted data converter computer 112 to convert the restricted account identifier into an unrestricted account alias and sends the transaction request message to the mobile management service computer 121 at the central processing platform.

In step 409, the mobile management service computer 121 at the first processing platform may receive the transaction request message and may process the transaction using the unrestricted account alias (e.g., PAN, email address, token, etc.) and the indicated biller. The mobile management service computer may process the transaction using the payment processing module 123 and the transaction may be processed by sending a message to a traditional payment processing network computer 160, contacting a debit network computer 140, or sending the transaction information to a mobile transaction payment processing computer 170, depending on the configuration of the payment system and the client and consumer preferences.

In some embodiments, the mobile management service computer 121 processes the transaction, receives authorization from an issuer (could be the mobile transaction payment processing computer 170, debit network computer 140, a mobile network operator 132, or a traditional issuer 136), and receives or generates a transaction response message. The transaction response message may be sent through the transaction system to one or more mobile communication devices through a similar process to that described herein including the conversion of the unrestricted account alias to a restricted account identifier.

In step 410, the mobile management service computer 121 generates (or receives) a settlement file for one or more transactions. The settlement file informs financial entities involved in the transaction how to exchange money in order to settle and clear the transactions. The issuers or financial entities could include a mobile network operator, issuer, or any other entity depending on the client and configuration of the mobile payment system.

In step 411, the mobile management service computer 121 sends the settlement file to the first processing platform computer 111. The settlement file may comprise the unrestricted account identifier or alias. As such, the first processing platform computer 111 uses the restricted data converter computer 112 to convert the unrestricted account identifier to the restricted account identifier, in order for the USSD aggregator, mobile network operator, and any other entities to process the settlement file. The local processing platform computer 111 may then forward the settlement file to the appropriate mobile network operator. The mobile network operator may then coordinate with issuers to settle the transaction or may settle the transactions themselves by transferring money between accounts, depending on the implementation details for the present system.

For example, the mobile network operator may settle the transaction payment with the local issuer if the local issuer is the client of the mobile management service 121. The first processing platform sends the settlement file to the mobile network operator after converting the unrestricted account identifier/alias back into the restricted account information (i.e. the phone number). The mobile network operator may then settle the transaction with an issuer (or bank) located in the restricted zone. Accordingly, the transaction has been processed from a central processing platform located outside the restricted zone without violating the restrictions or regulations.

Although the above transaction described in reference to FIG. 4 was directed to a single bill pay transaction, some embodiments may include two consumers using different mobile communication devices and as such, more than one conversion of restricted account identifiers may occur during a single transaction, authentication process, or payment process. For example, in a person-to-person money transfer transaction, a transaction request message may include two restricted account identifiers, one for the sender and one for the recipient. Accordingly, one restricted account identifier conversion may occur for the sending consumer and another conversion may occur for the recipient consumer so that the transaction request message may include two unrestricted account aliases (one for each restricted account identifier). Additionally, in some embodiments, multiple authentication request messages and authentication response messages may be sent to each entity within a transaction to ensure both the sender and recipient are authenticated. Conversions may occur for each separate authentication message. Note also that more than one type of restricted data may be converted or filtered during a transaction as well.

B. Service Request Processing

Although the above process is described in reference to a payment transaction originated from a mobile phone in a restricted zone, many other services relating to transactions using restricted information could be provided by a central processing platform located outside a restricted zone. For example, the system could be modified to provide central service request servicing outside of the restricted zone. The service requests may relate to technical, business, or other problems related to an entity's business. For example, a service request may be generated by a mobile network operator who is having trouble processing transactions generated by consumers they service.

A service request could be generated in any suitable fashion. For example, a service request could be generated by a human customer service representative in response to a mobile network operator informing a customer service representative at the first processing platform that transactions generated by their consumers are not being processed correctly. Some of the information included in the service request may be restricted information that is not allowed to be transmitted outside of the restricted zone. However, like the purchase transaction above, it may be beneficial to process the service request at a central location outside of the restricted zone. As such, if the central processing platform needs access to the service request information, the service request information that is restricted may be filtered from the service requests.

A local data filter located at the first processing platform may be implemented to filter restricted information from the service request database so that the service request may be processed by customer service representatives or systems located at the central processing platform without violating the regulations of the restricted zone. The process would work similarly to the purchase transaction above including receiving, at a server computer located in a restricted zone, a restricted service request, wherein the restricted service request includes restricted information that cannot be transferred outside the restricted zone. Once this information is received, the local data filter may generate an unrestricted service request by filtering the restricted service request to remove all restricted information. After generating the unrestricted service request, the local data filter or some other server computer at the first processing platform may send the unrestricted service request to an unrestricted service request database located outside of the restricted zone, where it may be stored in an unrestricted service request database.

Alternatively, the restricted service request data may be provided to an operator located at the second processing platform by providing view only or read only access to the service request database that is managed, monitored, and updated by the first processing platform. In this manner, service requests including restricted data may be transmitted outside of the restricted zone for more efficient and effective processing by a central processing entity but may not be stored, copied, reproduced, or otherwise violate any restrictions of the restricted zone. Accordingly, using a similar method to that described in reference to FIG. 4, the restricted data aliasing and filtering may be used to service requests from a central processing platform without violating regulations of the restricted zone. One of ordinary skill in the art would recognize that this process could be implemented for any transaction including restricted information that may not be transmitted outside of a restricted zone.

For example, the mobile management service computer may send a view only request associated with an unrestricted service request on behalf of an operator, may receive view only access to the restricted service request stored in the restricted service request database of the local processing platform, and may provide the view only access of the restricted service request to the operator. The operator may then perform the requested service associated with the restricted service request either through the mobile management services computer or by accessing another system.

III. Technical Benefits

Embodiments of the present invention provide numerous technical benefits. The use of a centralized central processing platform to process transactions originating from the restricted zone provides a more efficient processing design. Additionally, the hardware, software, support, and other necessities of providing transaction processing services may be more efficiently provided in one or a small number of locations instead of reproducing services for each restricted zone.

Accordingly, embodiments of the present invention provide more efficient solutions to processing mobile transactions in restricted zones that otherwise would require costly repetitive implementation of payment processing services in every restricted zone. Instead, by converting restricted information into a transferable format, the transactions may be processed by a central entity that can increase quality assurance, efficient use of infrastructure and equipment, as well as provide a higher quality of customer service, and increase transaction processing speed.

IV. Additional Embodiments

Embodiments of the invention may include a number of additional embodiments. For example, one embodiment of the present invention may be directed to a method. The method comprising receiving, at a server computer located in a restricted zone, a transaction request message including a restricted account identifier. The method may continue by converting the restricted account identifier into an unrestricted account alias and sending the unrestricted account alias to a management server located outside the restricted zone, wherein the management server processes the transaction request message.

An additional embodiment of the invention may include the method above, the method further comprising receiving a settlement file associated with the transaction request message from the management server, wherein the settlement file comprises the unrestricted account alias, converting the unrestricted account alias to the restricted account identifier, and sending the settlement file to a mobile network operator located in the restricted zone, wherein the mobile network operator is associated with the transaction request message, and wherein the mobile network operator settles the transaction by transferring money between one or more accounts or issuers located in the restricted zone.

Another embodiment may include a method as described above wherein before receiving the transaction request message including the restricted account identifier, the method further comprises receiving transaction information from a mobile communication device, determining an account associated with the mobile communication device, authenticating the mobile communication device and the account, determining available billers associated with the account, providing the available billers to the mobile communication device, and receiving the transaction request message, wherein the transaction request message includes a selected biller from the mobile communication device.

An alternative embodiment comprises a method as described above wherein before receiving the transaction request message including the restricted account identifier, the method further comprises receiving transaction information including the restricted account identifier from a mobile communication device, determining an account associated with the mobile communication device, converting the restricted account identifier to an unrestricted account alias, sending an authentication request message comprising the transaction information with the unrestricted account alias to the management server located outside the restricted area, wherein the management server authenticates the mobile communication device and the account associated with the mobile communication device using the unrestricted account alias and determines available billers associated with the account, receiving an authentication response message including the available billers associated with the account, converting the unrestricted account alias to the restricted account identifier, providing the available billers to the mobile communication device, and receiving the transaction request message, wherein the transaction request message includes a selected biller from the mobile communication device.

An additional embodiment of the invention may include the method above, the method further comprising receiving a restricted service request including restricted information, generating an unrestricted service request by filtering the restricted service request to remove the restricted information, and sending the unrestricted service request to the management server, wherein the management server stores the unrestricted service request in an unrestricted service request database located outside the restricted zone.

An additional embodiment of the invention may include the method of paragraph [0125] above, wherein the method further comprises receiving a view only request associated with the unrestricted service request from the management server on behalf of an operator located outside the restricted zone and providing view only access to the restricted service request, wherein an operator located outside the restricted zone provides a requested service associated with the restricted service request.

Additionally embodiments are also directed at a local processing platform comprising a restricted data converter computer located in a restricted zone, the restricted data converter computer coupled to an account information database. The restricted data converter computer comprising a processor and a computer-readable medium coupled to the processor, the computer-readable medium comprising code configured to perform a method as described above.

V. Exemplary Apparatuses

Figure 5:
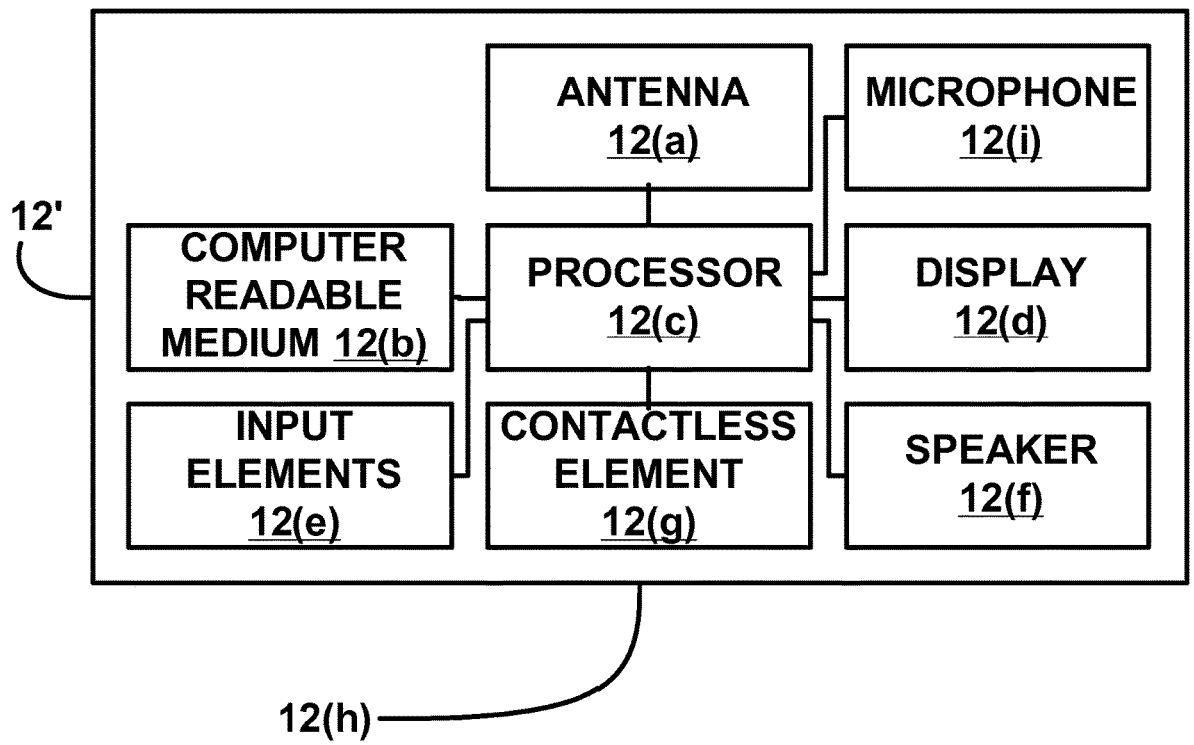
FIG. 5 shows a mobile communications device according to an exemplary embodiment of the present invention.

Mobile communications devices may be used to initiate the transactions at the merchant and/or receive receipts and/or alerts. FIG. 5 shows a block diagram of a mobile communications device in the form of a phone 12' that may be used in embodiments of the invention. The exemplary wireless phone 12' may comprise a computer readable medium and a body as shown in FIG. 5. The computer readable medium 12(b) may be present within the body 12(h), or may be detachable from it. The body 12(h) may be in the form a plastic substrate, housing, or other structure. The computer readable medium 12(b) may be in the form of (or may be included in) a memory that stores data (e.g., data relating to issuer specific payment services) and may be in any suitable form including a magnetic stripe, a memory chip, etc. The memory may store information such as financial information, etc. Financial information may include information such as bank account information, a bank identification number (BIN), credit or debit card number information, account balance information, expiration date, consumer information such as name, date of birth, etc. Any of this information may be transmitted by the phone 12'.

In some embodiments, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks may abide by it. It contains the cardholder's account, encrypted PIN, plus other discretionary data.

The phone 12' may further include a contactless element 12(g), which is typically implemented in the form of a semiconductor chip (or other data storage element) with an associated wireless transfer (e.g., data transmission) element, such as an antenna. Contactless element 12(g) is associated with (e.g., embedded within) phone 12' and data or control instructions transmitted via a cellular network may be applied to contactless element 12(g) by means of a contactless element interface (not shown). The contactless element interface functions to permit the exchange of data and/or control instructions between the mobile device circuitry (and hence the cellular network) and an optional contactless element 12(g).

Contactless element 12(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that may be used to exchange data between the phone 12' and an interrogation device. Thus, the phone 12' is capable of communicating and transferring data and/or control instructions via both cellular network and near field communications capability.

The phone 12' may also include a processor 12(c) (e.g., a microprocessor) for processing the functions of the phone 12' and a display 12(d) to allow a consumer to see phone numbers and other information and messages. The phone 12' may further include input elements 12(e) to allow a consumer to input information into the device, a speaker 12(f) to allow the consumer to hear voice communication, music, etc., and a microphone 12(i) to allow the user to transmit her voice through the phone 12'. The phone 12' may also include an antenna 12(a) for wireless data transfer (e.g., data transmission).

Figure 6:
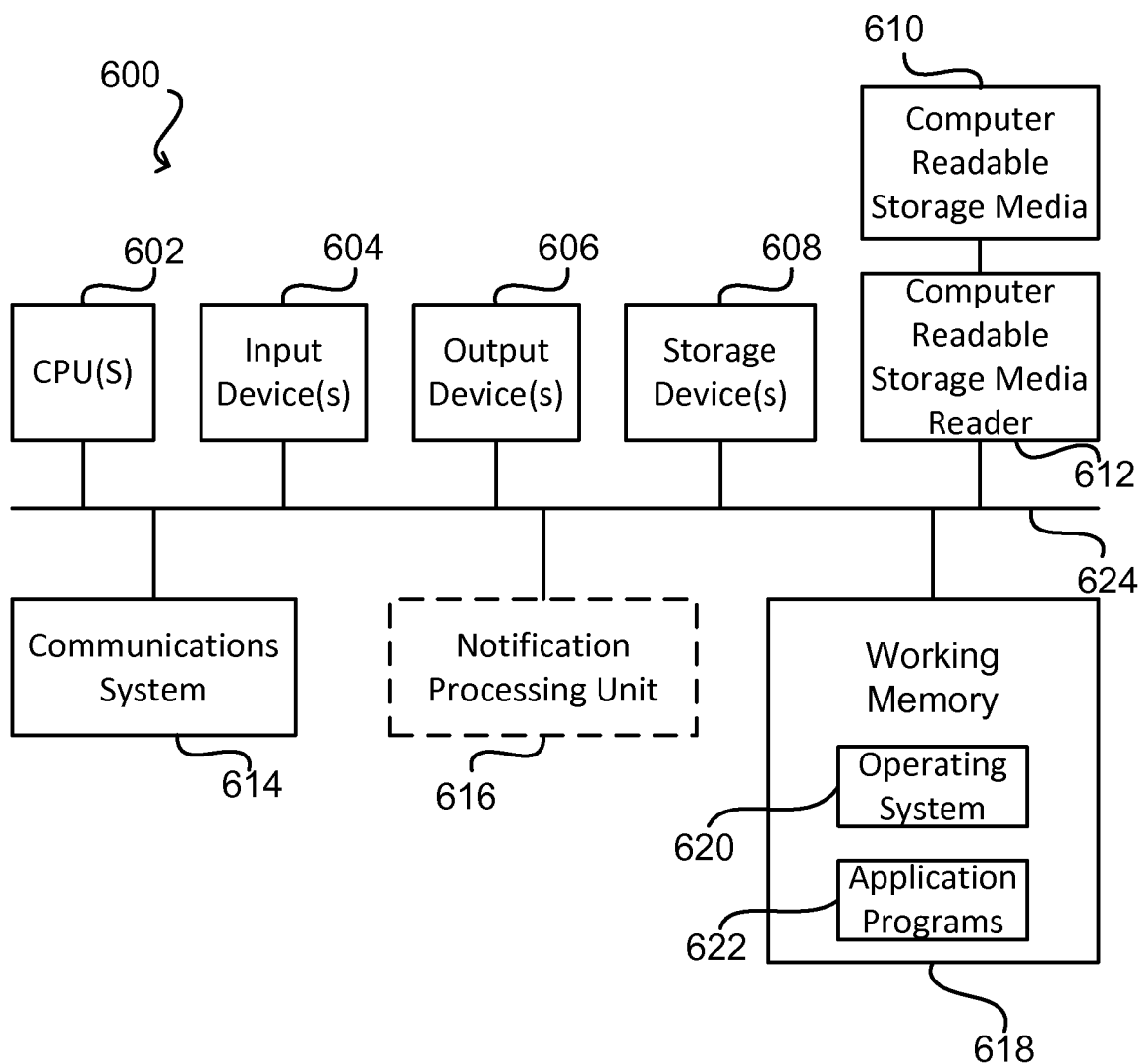
FIG. 6 illustrates an exemplary computer system in which various embodiments may be implemented.

The various participants and elements (e.g., the payment processing network, merchant, other entities, etc.) in embodiments of the invention may also operate one or more computer apparatuses (e.g., a server computer) to facilitate the functions described herein. Any of the elements in embodiments of the invention may use any suitable number of subsystems to facilitate the functions described herein. Examples of such subsystems or components are shown in FIG. 6. FIG. 6 illustrates an exemplary computer system 600, in which various embodiments may be implemented. The system 600 may be used to implement any of the computer systems described above (e.g., merchant computer apparatus, acquirer server, issuer server, payment processing server, mobile device, access device, etc.). The computer system 600 is shown comprising hardware elements that may be electrically coupled via a bus 624. The hardware elements may include one or more central processing units (CPUs) 602, one or more input devices 604 (e.g., a mouse, a keyboard, touchpad, etc.), and one or more output devices 606 (e.g., a display device, a printer, etc.). The computer system 600 may also include one or more storage devices 608. By way of example, the storage device(s) 608 may include devices such as disk drives, optical storage devices, solid-state storage device such as a random access memory ("RAM") and/or a read-only memory ("ROM"), which may be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which may include a digital signal processor DSP, a special-purpose processor, and/or the like.

The computer-readable storage media reader 612 may further be connected to a computer-readable storage medium 610, together (and, optionally, in combination with storage device(s) 608) comprehensively representing remote, local, fixed, and/or removable storage devices plus storage media for temporarily and/or more permanently containing, storing, transmitting, and retrieving computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It should be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A system comprising:
a processing platform computer located within a restricted zone and configured to:
receive a transaction request message with a restricted account identifier;
determine, by searching an associated database, that the transaction request message contains restricted information; and
transmit, to a restricted data converter computer, the transaction request message including the restricted account identifier based at least in part on determining that the transaction request message contains restricted information;
the restricted data converter computer configured to:
receive the transaction request message;
convert the restricted account identifier to an unrestricted account alias;
update the transaction request message to include the unrestricted account alias; and
transmit, to a central processing platform server computer located outside the restricted zone, the updated transaction request message;
the central processing platform server computer configured to:
receive the updated transaction request message that includes the unrestricted account alias;
request, from an issuer computer remotely located with respect to the central processing platform server computer, authorization for a transaction associated with the updated transaction request message;
receive, from the issuer computer, an authorization response message;
generate a settlement file associated with the updated transaction request message based at least in part on the authorization response message, the settlement file including the unrestricted account alias; and
transmit the settlement file to the processing platform computer that is located within the restricted zone.

2. The system of claim 1, wherein
the central processing platform server computer is further configured to send the settlement file to the processing platform computer that is located within the restricted zone, wherein the processing platform computer that is located within the restricted zone converts the unrestricted account alias to the restricted account identifier and sends the settlement file to a mobile network operator associated with the transaction request message, and wherein the mobile network operator settles the transaction by transferring money between one or more accounts or issuers located within the restricted zone.

3. The system of claim 1, where the central processing platform server computer outside of the restricted zone is further configured to determine an account associated with the unrestricted account alias.

4. The system of claim 1, wherein the restricted account identifier is a telephone number associated with a first mobile communication device.

5. The system of claim 4, wherein the unrestricted account alias is a primary account number associated with an issuer located within the restricted zone, the issuer associated with the issuer computer.

6. The system of claim 1, wherein the processing platform computer is further configured to:
receive transaction information including the restricted account identifier from a mobile communication device before receiving the transaction request message including the unrestricted account alias;
determine an account associated with the mobile communication device;
authenticate the account associated with the mobile communication device;
determine available billers associated with the account; and
transmit an authentication response message including the available billers associated with the account to the mobile communication device.

7. The system of claim 1, wherein the processing platform computer is further configured to:
generate an unrestricted service request, by filtering a restricted service request comprising the restricted information to remove the restricted information; and
transmit the unrestricted service request to the central processing platform server computer; and wherein
the central processing platform server computer is further configured to store
the unrestricted service request in an unrestricted service request database located outside the restricted zone.

8. The system of claim 7, wherein the central processing platform server computer is further configured to:
send, to the processing platform computer, a view only request associated with the unrestricted service request on behalf of an operator;
receive, from the processing platform computer, view only access to the restricted service request; and
provide the view only access of the restricted service request to the operator, wherein the operator perform a requested service associated with the restricted service request.

9. The system of claim 1, wherein the transaction request message is associated with a load transaction, an unload transaction, a payment transaction, or a transfer transaction.

* * * * *